United States Patent
Sakhnini et al.

(10) Patent No.: US 12,267,717 B2
(45) Date of Patent: Apr. 1, 2025

(54) TECHNIQUES FOR INVALIDATING A MEASUREMENT REPORT

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/886,417

(22) Filed: Aug. 11, 2022

(65) Prior Publication Data

US 2024/0056855 A1 Feb. 15, 2024

(51) Int. Cl.
*H04W 24/10* (2009.01)
*H04L 5/00* (2006.01)

(52) U.S. Cl.
CPC .......... *H04W 24/10* (2013.01); *H04L 5/0048* (2013.01)

(58) Field of Classification Search
CPC .............................. H04W 24/10; H04L 5/0048
See application file for complete search history.

(56) References Cited

U.S. PATENT DOCUMENTS

2016/0226648 A1* 8/2016 Lee ........................ H04L 1/0026

* cited by examiner

*Primary Examiner* — Peter P Chau
(74) *Attorney, Agent, or Firm* — Holland & Hart LLP

(57) ABSTRACT

Methods, systems, and devices for invalidating a measurement report are described. A user equipment (UE) may receive a message indicating of a set of parameters associated with transmission of a measurement report and may receive one or more reference signals. The UE may transmit, in accordance with the set of parameters, the measurement report indicating a set of measurements associated with the one or more reference signals received by the UE. Additionally, the UE may transmit an invalidation message indicating that at least a portion of the measurement report is invalid based on a subsequent measurement associated with the one or more reference signals differing by a threshold amount from a corresponding measurement of the set of measurements.

30 Claims, 16 Drawing Sheets

TECHNIQUES FOR INVALIDATING A MEASUREMENT REPORT

FIELD OF TECHNOLOGY

The following relates to wireless communications, including techniques for invalidating a measurement report.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for invalidating a measurement report. For example, the described techniques provide for a user equipment (UE), or some other network device, to update or invalidate a previously transmitted measurement report. In some cases, a UE may be configured to receive and measure one or more reference signals from a network entity, such as channel state information (CSI) reference signals (CSI-RSs). The UE may transmit one or more reports (e.g., CSI reports, measurements reports) to the network entity based on the one or more reference signals. For example, the UE may select a preferred beam for communications between the UE and the network entity and the UE may transmit an indication of the selected beam to the network entity. In another example, the UE may be configured to transmit a report to the network entity indicative of the one or more reference signals measurements. In some cases, a network entity may perform beam management procedures based on the selected beam, or the one or more reference signal measurements. In some implementations, a UE may transmit an indication of a change of status, or update information included in the previous one or more measurement reports (e.g., CSI reports) to the network entity. For example, the UE may indicate to the network entity that the previous report is invalid based on measurements taken by the UE after the UE transmitted the previous report. In some cases, the UE may transmit an indication to the network entity to invalidate, revalidate, or re-arrange one or more previously reported measurements. The network entity may then perform beam management procedures based on the updated information from the UE.

A method for wireless communications at a UE is described. The method may include receiving a message indicative of a set of parameters associated with transmission of a measurement report, receiving one or more reference signals, transmitting, in accordance with the set of parameters, the measurement report indicating a set of measurements associated with the one or more reference signals received by the UE, and transmitting an invalidation message indicating that at least a portion of the measurement report is invalid based on a subsequent measurement associated with the one or more reference signals differing from a corresponding measurement from the set of measurements.

An apparatus for wireless communications at a UE is described. The apparatus may include a processor, memory coupled with the processor, and instructions stored in the memory. The instructions may be executable by the processor to cause the apparatus to receive a message indicative of a set of parameters associated with transmission of a measurement report, receive one or more reference signals, transmit, in accordance with the set of parameters, the measurement report indicating a set of measurements associated with the one or more reference signals received by the UE, and transmit an invalidation message indicating that at least a portion of the measurement report is invalid based on a subsequent measurement associated with the one or more reference signals differing from a corresponding measurement from the set of measurements.

Another apparatus for wireless communications at a UE is described. The apparatus may include means for receiving a message indicative of a set of parameters associated with transmission of a measurement report, means for receiving one or more reference signals, means for transmitting, in accordance with the set of parameters, the measurement report indicating a set of measurements associated with the one or more reference signals received by the UE, and means for transmitting an invalidation message indicating that at least a portion of the measurement report is invalid based on a subsequent measurement associated with the one or more reference signals differing from a corresponding measurement from the set of measurements.

A non-transitory computer-readable medium storing code for wireless communications at a UE is described. The code may include instructions executable by a processor to receive a message indicative of a set of parameters associated with transmission of a measurement report, receive one or more reference signals, transmit, in accordance with the set of parameters, the measurement report indicating a set of measurements associated with the one or more reference signals received by the UE, and transmit an invalidation message indicating that at least a portion of the measurement report is invalid based on a subsequent measurement associated with the one or more reference signals differing from a corresponding measurement from the set of measurements.

In some examples of the method, apparatuses, and non-transitory computer-readable medium described herein, transmitting the invalidation message may include operations, features, means, or instructions for transmitting an indication to re-arrange the one or more reference signals in the measurement report.

Some examples of the method, apparatuses, and non-transitory computer-readable medium described herein may further include operations, features, means, or instructions for re-arranging the one or more reference signals includes switching a highest-ranked reference signal to a second-highest rank, and switching a second-highest ranked reference signal to a highest-rank.

In some examples of the method, apparatuses, and non-transitory computer-readable medium described herein, transmitting the invalidation message may include operations, features, means, or instructions for transmitting an indication to in-validate an entirety of the measurement report.

In some examples of the method, apparatuses, and non-transitory computer-readable medium described herein, the invalidation message includes one bit, or two bits to indicate that the measurement report may be invalidated in entirety.

In some examples of the method, apparatuses, and non-transitory computer-readable medium described herein, transmitting the invalidation message may include operations, features, means, or instructions for transmitting identifiers of the one or more reference signals that may be invalid.

Some examples of the method, apparatuses, and non-transitory computer-readable medium described herein may further include operations, features, means, or instructions for transmitting, subsequent to the invalidation message, a second invalidation message indicating that at least the portion of the measurement report may be re-validated.

In some examples of the method, apparatuses, and non-transitory computer-readable medium described herein, transmitting the second invalidation message may include operations, features, means, or instructions for transmitting one or more identifiers associated with at least one of the one or more reference signals that may be re-validated.

In some examples of the method, apparatuses, and non-transitory computer-readable medium described herein, transmitting the second invalidation message may include operations, features, means, or instructions for transmitting a set of one or more bits to indicate that an entirety of the measurement report may be re-validated.

In some examples of the method, apparatuses, and non-transitory computer-readable medium described herein, transmitting the invalidation message may include operations, features, means, or instructions for transmitting an indication of an action from a set of actions associated with the invalidation message, the set of actions including invalidation, re-validation, and re-arranging.

Some examples of the method, apparatuses, and non-transitory computer-readable medium described herein may further include operations, features, means, or instructions for receiving, in response to the invalidation message, a request to transmit a second measurement report including updated measurements associated with one or more of the reference signals.

In some examples of the method, apparatuses, and non-transitory computer-readable medium described herein, the second measurement report may be an aperiodic measurement report.

In some examples of the method, apparatuses, and non-transitory computer-readable medium described herein, transmitting the invalidation message may include operations, features, means, or instructions for transmitting an indication to invalidate a set of multiple measurement reports.

Some examples of the method, apparatuses, and non-transitory computer-readable medium described herein may further include operations, features, means, or instructions for receiving an indication of a duration after transmission of the measurement report the UE may be to refrain from transmitting the invalidation message.

Some examples of the method, apparatuses, and non-transitory computer-readable medium described herein may further include operations, features, means, or instructions for receiving an indication of a duration after transmission of the invalidation message the UE may be to refrain from transmitting a second invalidation message.

Some examples of the method, apparatuses, and non-transitory computer-readable medium described herein may further include operations, features, means, or instructions for receiving an indication of a maximum number of invalidation messages allowed to be transmitted by the UE prior to reception of a response to one or more invalidation messages.

Some examples of the method, apparatuses, and non-transitory computer-readable medium described herein may further include operations, features, means, or instructions for receiving an indication of a trigger for transmission of the invalidation message, the trigger being a delta between a first measurement of a reference signal and subsequent measurement of the reference signal.

Some examples of the method, apparatuses, and non-transitory computer-readable medium described herein may further include operations, features, means, or instructions for receiving an indication of a trigger for transmission of the invalidation message, the trigger being that subsequent measurements of at least two reference signals result in the at least two reference signals being ranked differently than a rank-order included in the measurement report.

Some examples of the method, apparatuses, and non-transitory computer-readable medium described herein may further include operations, features, means, or instructions for receiving an indication of a duration between the set of measurements and subsequent measurements, where the UE may be to refrain from measuring the one or more reference signals in the duration.

In some examples of the method, apparatuses, and non-transitory computer-readable medium described herein, transmitting the invalidation message may include operations, features, means, or instructions for transmitting an uplink control channel message, an uplink shared channel message, or a random access channel (RACH) message including the invalidation message.

Some examples of the method, apparatuses, and non-transitory computer-readable medium described herein may further include operations, features, means, or instructions for performing filtering of the subsequent measurement associated with the one or more reference signals, where transmission of the invalidation message may be based on the filtering.

A method for wireless communications at a network entity is described. The method may include transmitting a message indicative of a set of parameters associated with transmission of a measurement report by a UE, transmitting one or more reference signals, receiving, in accordance with the set of parameters, the measurement report indicating a set of measurements associated with the one or more reference signals received by the UE, and receiving an invalidation message indicating that at least a portion of the measurement report is invalid based on a subsequent measurement associated with the one or more reference signals differing from a corresponding measurement from the set of measurements.

An apparatus for wireless communications at a network entity is described. The apparatus may include a processor, memory coupled with the processor, and instructions stored in the memory. The instructions may be executable by the processor to cause the apparatus to transmit a message indicative of a set of parameters associated with transmission of a measurement report by a UE, transmit one or more reference signals, receive, in accordance with the set of parameters, the measurement report indicating a set of measurements associated with the one or more reference signals received by the UE, and receive an invalidation message indicating that at least a portion of the measurement report is invalid based on a subsequent measurement associated with the one or more reference signals differing from a corresponding measurement from the set of measurements.

Another apparatus for wireless communications at a network entity is described. The apparatus may include means for transmitting a message indicative of a set of parameters associated with transmission of a measurement report by a UE, means for transmitting one or more reference signals, means for receiving, in accordance with the set of parameters, the measurement report indicating a set of measurements associated with the one or more reference signals received by the UE, and means for receiving an invalidation message indicating that at least a portion of the measurement report is invalid based on a subsequent measurement associated with the one or more reference signals differing from a corresponding measurement from the set of measurements.

A non-transitory computer-readable medium storing code for wireless communications at a network entity is described. The code may include instructions executable by a processor to transmit a message indicative of a set of parameters associated with transmission of a measurement report by a UE, transmit one or more reference signals, receive, in accordance with the set of parameters, the measurement report indicating a set of measurements associated with the one or more reference signals received by the UE, and receive an invalidation message indicating that at least a portion of the measurement report is invalid based on a subsequent measurement associated with the one or more reference signals differing from a corresponding measurement from the set of measurements.

In some examples of the method, apparatuses, and non-transitory computer-readable medium described herein, receiving the invalidation message may include operations, features, means, or instructions for receiving an indication to re-arrange the one or more reference signals in the measurement report.

Some examples of the method, apparatuses, and non-transitory computer-readable medium described herein may further include operations, features, means, or instructions for re-arranging the one or more reference signals includes switching a highest-ranked reference signal to a second-highest rank, and switching a second-highest ranked reference signal to a highest-rank.

In some examples of the method, apparatuses, and non-transitory computer-readable medium described herein, receiving the invalidation message may include operations, features, means, or instructions for receiving an indication to in-validate an entirety of the measurement report.

In some examples of the method, apparatuses, and non-transitory computer-readable medium described herein, the invalidation message includes one bit, or two bits to indicate that the measurement report may be invalidated in entirety.

In some examples of the method, apparatuses, and non-transitory computer-readable medium described herein, receiving the invalidation message may include operations, features, means, or instructions for receiving one or more identifiers associated with at least one of the one or more reference signals that may be invalid.

Some examples of the method, apparatuses, and non-transitory computer-readable medium described herein may further include operations, features, means, or instructions for receiving, subsequent to the invalidation message, a second invalidation message indicating that at least the portion of the measurement report may be re-validated.

In some examples of the method, apparatuses, and non-transitory computer-readable medium described herein, receiving the second invalidation message may include operations, features, means, or instructions for receiving one or more identifiers associated with at least one of the one or more reference signals that may be re-validated.

In some examples of the method, apparatuses, and non-transitory computer-readable medium described herein, the second invalidation message includes one bit, or two bits to indicate that an entirety of the measurement report may be re-validated.

In some examples of the method, apparatuses, and non-transitory computer-readable medium described herein, receiving the invalidation message may include operations, features, means, or instructions for receiving an indication of an action from a set of actions associated with the invalidation message, the set of actions including invalidation, re-validation, and re-arranging.

Some examples of the method, apparatuses, and non-transitory computer-readable medium described herein may further include operations, features, means, or instructions for transmitting, in response to the invalidation message, a request for the UE to transmit a second measurement report including updated measurements associated with one or more of the reference signals.

In some examples of the method, apparatuses, and non-transitory computer-readable medium described herein, the second measurement report may be an aperiodic measurement report.

In some examples of the method, apparatuses, and non-transitory computer-readable medium described herein, receiving the invalidation message may include operations, features, means, or instructions for receiving an indication to invalidate a set of multiple measurement reports.

Some examples of the method, apparatuses, and non-transitory computer-readable medium described herein may further include operations, features, means, or instructions for transmitting an indication of a duration after transmission of the measurement report the UE may be to refrain from transmitting the invalidation message.

Some examples of the method, apparatuses, and non-transitory computer-readable medium described herein may further include operations, features, means, or instructions for transmitting an indication of a duration after transmission of the invalidation message the UE may be to refrain from transmitting a second invalidation message.

Some examples of the method, apparatuses, and non-transitory computer-readable medium described herein may further include operations, features, means, or instructions for transmitting an indication of a maximum number of invalidation messages allowed to be transmitted by the UE prior to reception of a response to one or more of invalidation messages.

Some examples of the method, apparatuses, and non-transitory computer-readable medium described herein may further include operations, features, means, or instructions for transmitting an indication of a trigger for transmission of the invalidation message, the trigger being a delta between a first measurement of a reference signal and subsequent measurement of the reference signal.

Some examples of the method, apparatuses, and non-transitory computer-readable medium described herein may further include operations, features, means, or instructions for transmitting an indication of a trigger for transmission of the invalidation message, the trigger being that subsequent measurements of at least two reference signals result in the at least two reference signals being ranked differently than a rank-order included in the measurement report.

Some examples of the method, apparatuses, and non-transitory computer-readable medium described herein may further include operations, features, means, or instructions for transmitting an indication of a duration between the set of measurements and subsequent measurements, where the UE may be to refrain from measuring the one or more reference signals in the duration.

In some examples of the method, apparatuses, and non-transitory computer-readable medium described herein, receiving the invalidation message may include operations, features, means, or instructions for receiving an uplink control channel message, an uplink shared channel message, or a RACH message including the invalidation message.

Some examples of the method, apparatuses, and non-transitory computer-readable medium described herein may further include operations, features, means, or instructions for performing beam management procedure based on the measurement report and the invalidation message.

DETAILED DESCRIPTION

Figure 1:
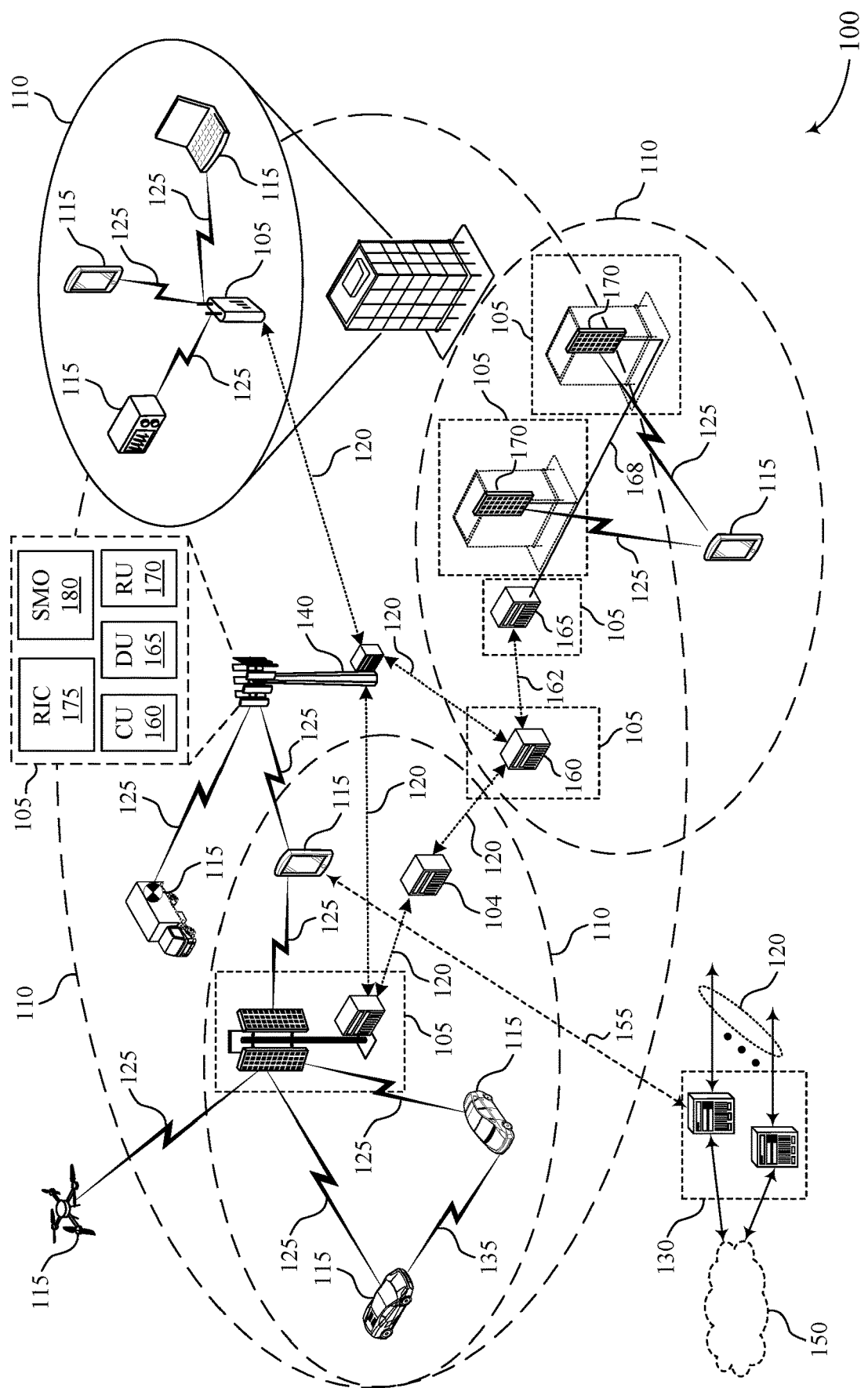
FIGS. 1 through 3 illustrate examples of wireless communications systems that support techniques for invalidating a measurement report in accordance with one or more aspects of the present disclosure.

In some wireless communications systems, a user equipment (UE) may be configured to measure reference signals (e.g., channel state information (CSI) reference signals (CSI-RSs) transmitted by a network entity and after measuring, the UE may be configured to transmit a measurement report that indicates the measurements to the network entity in response. In some cases, the network entity may use the measurement report to perform beam management operations which may include switching beams for communications between the UE and network entity. In some cases, however, the network entity may determine or select the beam management operations based on a stale (e.g., old) measurement report, such as a measurement report that was received at the network entity before a threshold time. For instance, the environment or channel conditions between the UE and the network entity may be changing more frequently than the UE is configured to transmit measurement reports. In such cases, the network entity may switch to a beam indicated by the measurement report as a preferred beam. If the data indicated by the measurement report is old or stale, the selected beam may no longer be preferred for communications between the UE and the network entity (e.g., due to the rapidly changing channel conditions).

To improve measurement reporting procedures, a UE may be configured to update the status of the previous one or measurement reports (e.g., CSI reports). The UE may transmit an indication to the network entity to invalidate, revalidate, or re-arrange one or more previously reported measurements. For example, the UE may transmit an indication to the network entity that at least a portion of a previously transmitted measurement report has changed. In some cases, the indication may invalidate an entire measurement report, or a portion of a measurement report. In some cases, the indication may rearrange information included in the previously transmitted measurement report. For example, the indication may swap the strongest two measurements included in the previous measurement report.

In some cases, the UE may indicate to the network entity that the previous report is invalid based on measurements determined by the UE after the previous report. For example, the UE may be triggered to transmit the indication after determining that one or more measurements associated with one or more reference signals have changed, have swapped orders, have satisfied a threshold, or a combination thereof. In some cases, the UE may be configured with parameters associated with how frequently a UE may transmit an indication. For example, the UE may be configured with a duration the UE is to wait prior to transmitting an indication (e.g., a minimum time from a last measurement report, a minimum time between invalidation indications), or a maximum number of indications the UE may transmit without reply from the network entity, or a combination thereof.

Particular aspects of the subject matter described herein may be implemented to realize one or more advantages. For example, beam management procedures performed based on stale measurement reports may be mitigated. The described techniques may support improvements in beam management procedures by decreasing signaling overhead, decreasing latency, reducing power consumption of the UE, reducing power consumption for the network entity, and improving reliability (e.g., beam switching reliability), among other advantages. As such, supported techniques may include improved network operations, and, in some examples, may promote network efficiencies, among other benefits.

Aspects of the disclosure are initially described in the context of wireless communications systems. Aspects of the disclosure are further described and illustrated by a process flow diagram. Aspects of the disclosure are further illustrated by and described with reference to apparatus diagrams, system diagrams, and flowcharts that relate to techniques for invalidating a measurement report.

FIG. 1 illustrates an example of a wireless communications system 100 that supports techniques for invalidating a measurement report in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as L) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for invalidating a measurement report as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A CSI-RS is a reference signal that is used in the downlink direction in communications systems (e.g., 5G NR), for the purpose of channel sounding and may be used to measure the characteristics of a radio channel so that devices (e.g., a UE 115, network entity 105) may use correct modulation, code rate, beam forming etc. A UE 115 may use CSI-RSs to measure the quality of the downlink channel and report the quality in the uplink through reports (e.g., CSI reports, channel quality information (CQI) reports, measurement reports).

In some cases, a configured CSI-RS may correspond to any number of antenna ports, each corresponding to a channel to be sounded. A CSI-RS may be used for beamforming support, but may be configured to be either beam-specific or UE-specific. For example, a network device, such as a network entity 105 may use the reports based on the CSI-RSs in performing tasks such as beam acquisition and evaluation, adaptation of beams (e.g., beam refinement), decision making for beam switching and UE tracking with steerable beams.

In some implementations, a network entity 105 may schedule CSI-RSs as specific reference signals per beam to allow the CSI-RSs to be distinguished from one another. Resource elements carrying a CSI-RS may be configured to be either zero power (ZP-CSI-RS) or non-zero power (NZP-CSI-RS). The zero and non-zero power concept may be used to distinguish between beams. An NZP-CSI-RS may be used for procedures such as Channel Measurement, Beam Management, Beam measurement, connected mode mobility etc. ZP-CSI-RS may be empty resource elements, used mostly for interference measurement. A ZP-CSI-RSs may define a set of resource elements which do not include any signals for the UE. ZP-CSI-RS REs may puncture a PDSCH so the UE 115 does not expect to receive any downlink data within them (e.g., ZP-CSI-RS may be used to configure a resource element puncturing pattern for the PDSCH when some resource elements are allocated for other purposes).

A CSI-RS may be mapped onto certain resources in a frequency domain, time domain, etc. For example, a CSI-RS may be configured for a given downlink bandwidth part (BWP) and may then be assumed to be confined within that BWP and use the numerology associated with that BWP. A CSI-RS may be configured to cover the full BW of the BWP or just a fraction of the BW.

A CSI-RS may be configured for aperiodic, periodic, or semi-persistent transmission. In the case of aperiodic CSI-RS transmission, no periodicity is configured. Rather, a device is explicitly informed ("triggered") about each CSI-RS transmission instance by means of signaling in downlink control information (DCI), or some other control message. In the case of periodic CSI-RS transmission, a device can assume that a configured CSI-RS transmission occurs every Nth slot, where N ranges from as low as 4 (e.g., CSI-RS transmissions occur every 4th slot), to as high as 640 (e.g., CSI-RS transmission occur every 640th slot). In addition to the periodicity, the device may also be configured with a specific slot offset for the CSI-RS transmission. In the case of semi-persistent CSI-RS transmission, a certain CSI-RS periodicity and corresponding slot offset are configured in the same way as for periodic CSI-RS transmission. However, actual CSI-RS transmission can be activated or deactivated based on MAC control elements (MAC-CEs). Once the CSI-RS transmission has been activated, the device may assume that the CSI-RS transmission will continue according to the configured periodicity until it is explicitly deactivated. Similarly, once the CSI-RS transmission has been deactivated, the device can assume that there will be no CSI-RS transmissions according to the configuration until it is explicitly re-activated. This periodic, semi-persistent, or aperiodic transmission is not a property of a CSI-RS itself but rather the property of a CSI-RS resource set. As such, activation/deactivation and triggering of semi-persistent and aperiodic CSI-RS, respectively, may not be performed for a specific CSI-RS but for the set of CSI-RS within a resource set.

Accordingly, a UE 115 may be configured to receive one or more reference signals (e.g., CSI-RSs) from a network entity 105 and may perform measurements on the one or more received references signals. The measurements may include reference signal received power (RSRP), reference signal received quality (RSRQ), signal to noise plus interference ratio (SINR), etc. RSRP measurements may be used for connected mode mobility, power control calculations, and beam management. RSRP measurements may be generated and reported at both layer 1 and layer 3. For example, a UE 115 may provide CSI-RSRP measurements at Layer 1 when transmitting CSI to the network entity 105. Alternatively, a UE 115 may provide CSI-RSRP measurements at Layer 3 when transmitting an RRC Measurement Report. CSI-RSRP measurements may represent the average power received from a single resource element allocated to the CSI-RS. CSI-RS measurements may be filtered at Layer 1 to help remove the impact of noise and to improve measurement accuracy. RSRQ measurements may be used for mobility procedures. CSI-RSRQ may be defined as CSI, RSRQ=CSI-RSRP/(RSSI/N), where N is the number of Resource Blocks across which the Received Signal Strength Indicator (RSSI) is measured (e.g., RSSI/N defines the RSSI per Resource Block). The RSSI represents the total received power from all sources including interference and noise. The RSRP and RSSI are both measured across the same set of Resource Blocks. The RSSI may be measured during symbols which contain CSI-RS resource elements. SINR may be used for connected mode mobility procedures. The CSI-SINR represents the ratio of the wanted signal (e.g., intended signal) power to the interference plus noise power. Both the wanted signal power and the interference plus noise power are measured from resource elements used by the CSI-RS.

In some cases, the UE 115 may transmit a measurement report to the network entity 105 based on the measurements. For example, the UE 115 may select a preferred beam for communications between the UE 115 and the network entity 105 and the UE 115 may transmit an indication of the selected beam to the network entity 105. In another example, the UE 115 may transmit a measurement report including indications of the measurements associated with the one or more reference signals. In some cases, the UE may rank one or more beams and indicate the ranking to the network entity 105.

In some implementations, the measurement report may include an index and associated measurements for CSI-RSs (e.g., for beams associated with the CSI-RSs). In some cases, the UE 115 may report the index and measurement for a quantity of best beams (e.g., the top N beams, beam associated with measurements that meet a threshold). The measurements may be applicable to NZP CSI-RSs, synchronization signal blocks (SSBs), or CSI interference measurement (CSI-IM), and may be either L1-RSRP or L1-SINR. The UE 115 may be configured with various CSI resource settings or report settings. For example, the UE 115 may be configured with one or more CSI resource settings (e.g., by CSI-ResourceConfig), and one or more CSI resource sets (e.g., NZP CSI-RS, synchronization signal block (SSB), or SCI-IM). Configuration for CSI reporting settings (e.g., by a field CSI-ReportConfig) may include a parameter (e.g., reportQuantity) indicating the quantities to report, such as quantities related to CSI, L1-RSPRP, or L1-SINR.

In some examples, CSI report settings may be linked to CSI resource settings. Report settings may include periodic, semi-persistent, and aperiodic reporting, where periodic reporting may be sent using a physical uplink shared channel (PUSCH), semi-persistent reporting may be sent using a physical uplink control channel (PUCCH) (e.g., anticipated or deactivated using MAC-CE) or PUSCH (e.g., triggered using DCI), and aperiodic reporting may be sent using a PUCCH. Resource settings may include periodic, semipersistent, and aperiodic CSI-RS. In some cases, the type of reporting that a UE may perform (e.g., periodic, semi-persistent, and aperiodic reporting) may be based on the type of CSI-RS (e.g., periodic, semipersistent, and aperiodic CSI-RS). Some linkages that may be supported may include periodic reporting for periodic CSI-RSs, semi-persistent reporting for periodic CSI-RSs, semi-persistent reporting for semi-persistent CSI-RSs, aperiodic reporting for periodic CSI-RS, aperiodic reporting for semi-persistent CSI-RS, and aperiodic reporting for aperiodic CSI-RS.

Aperiodic and semi-persistent states may by triggered by trigger states. For example, one or more lists of trigger states for aperiodic and semi-persistent state triggering may be utilized. The trigger states may have corresponding configurations. For example, each trigger state for aperiodic triggering may include a list of associated configurations (e.g., CSI-ReportConfigs) indicating resource set identifiers. Resource set identifiers may be allocated for channels or interference. Each trigger state or semi-persistent triggering may include an associated configuration (e.g., CSI-ReportConfig).

Triggers may vary for different states. For example, aperiodic and semi-persistent state triggering may be configured in RRC and triggered by DCI or MAC-CE. For DCI, aperiodic and semi-persistent state triggering may be triggered on a PUSCH by selection from a list. For MAC-CE, semi-persistent state triggering may be triggered on a PUCCH. Additional configurations may include configurations for L1-RSRP and L1-SINR measurements. L1-RSRP may be configured with resource setting, which may include a threshold (e.g., 16 CSI-RS resource sets, 64 resources within each resource set, or 128 total CSI-RS resources). L1-SINR may be configured with a resource setting with a threshold (e.g., 64 CSI-RS resources or 64 SSBs).

L1-SINR may be configured with various combinations of channel measurement information (CMR) and interference measurement resources (IMR). A first combination may include the same NZP CSI-RS for the CMR and the IMR. A second combination may include an SSB for the CMR and include a ZP CSI-RS for the IMR. A third combination may include an SSB for the CMR and include a NZP CSI-RS for the IMR. A fourth combination may include NZP CSI-RS for the CMR and include a ZP CSI-RS for the IMR. A fifth combination may include a NZP CSI-RS for the CMR and a different NZP CSI-RS for the IMR.

Beam reporting may be group-based. For example, group-based beam reporting may be implemented to account for beams the UE 115 may receive simultaneously (e.g., UEs capable of receiving on multiple panels, multiple reflected transmission beams are received using the same UE panel). In some examples, group-based beam reporting may enable a network entity 105 to transmit data in multiple (e.g., two) beams, or switch transmission beams without delay within the beam group.

The report structure of a measurement report may be based on whether group-based beam reporting is disabled or enabled. If group-based beam reporting is disabled, the UE 115 may report multiple different CRI or synchronization signal/physical broadcast channel block resource indicator (SSBRI) for each report setting, as depicted by the example of Table 1, below. If group-based beam reporting is enabled, the UE 115 may report two different CRI or SSBRI for each report setting, as depicted by the example of Table 2, below. In either case, the UE may indicate the CSI-RS associated with the highest measurement and indicate at least one other CSI-RS as a differential with respect to the highest CSI-RS measurement. In some examples, measured values may be configured to have a threshold. For example, a largest measured value may be quantized to N bits (e.g., 7 bits) and other measurement (e.g., a differential with respect to the largest measurement) may be quantized to M bits (e.g., 4 bits). In some cases, a field (e.g., beamReportTiming) may indicate the time between the downlink reference signal (e.g., SSB, CSI-RS) and the uplink beam report.

TABLE 1

Group-based beam reporting - disabled

Setting 1/CRI 1/Meas. 1 (Highest)
Setting 1/CRI 2/Meas. 2 (Diff)
Setting 1/CRI 3/Meas. 3 (Diff)
Setting 1/CRI 4/Meas. 4 (Diff)

TABLE 1-continued

Group-based beam reporting - disabled

Setting 2/CRI 1/Meas. 1 (Highest)
Setting 2/CRI 2/Meas. 2 (Diff)
Setting 2/CRI 3/Meas. 3 (Diff)
Setting 2/CRI 4/Meas. 4 (Diff)

TABLE 2

Group-based beam reporting - enabled

Setting 1/CRI 1/Meas. 1 (Highest)
Setting 1/CRI 2/Meas. 2 (Diff)
Setting 2/CRI 1/Meas. 1 (Highest)
Setting 2/CRI 2/Meas. 2 (Diff)

In some examples, the network entity 105 may respond to a measurement report (e.g., L1 measurement report), such as by performing beam-switching to select a beam for communications between the UE 115 and the network entity 105 based on the measurement report. In some examples, the network entity 105 may not respond to one or more measurement reports or may respond after the measurement report has become obsolete (e.g., stale), such as due to a long L1 report periodicity cycle (e.g., a periodicity cycle above a threshold) or another network dependent factor. In some examples, the network entity 105 may beam switch or perform other beam management procedures based on the last reported measurements (e.g., the last reported measurement report), which may be old, obsolete, or stale.

For example, a UE 115 may transmit a first measurement report at a first time and the UE 115 may continue to perform CSI-RS measurements. However, the UE 115 may be configured to wait to transmit a second measurement report until a second time. In some cases, the first time and the second time may be separated by a large duration, the environment between the UE 115 and the network entity 105 may be changing more quickly than the UE 115 is configured to transmit measurement reports, etc. In such cases, the first measurement report may become obsolete before the UE 115 is configured to transmit the second measurement report. For example, the network entity 105 may switch to a beam based on the first measurement report but because the measurement report data is stale, the selected beam may no longer be preferred for communications between the UE 115 and the network entity 105. Thus, the beam switch may no longer be relevant, may be an incorrect beam, or an unreported beam. Invalid beam switching may lead to an un-optimized beam and performance degradation.

To mitigate scenarios in which beam management procedures are performed based on obsolete measurement reports, a UE 115 may be configured to update the status of one or more reports previously transmitted to the network entity 105. The UE 115 may transmit an indication to the network entity to in-validate, re-validate, or re-arrange one or more previously reported measurements. The UE 115 may indicate that a least a portion of a previously transmitted measurement report has changed. In some cases, the indication may invalidate an entire measurement report, or a portion of a measurement report. In some cases, the indication may rearrange or update information included in the previously transmitted measurement report. For example, the indication may swap the strongest two measurements included in the previous measurement report.

The UE 115 may be triggered to transmit the indication upon determining that measurements associated with one or more reference signals have changed, have swapped orders, have fallen below a threshold, or a combination thereof, as described in more detail with reference to FIG. 3. In some cases, the UE 115 may be configured with parameters associated with constraining how frequently a UE may transmit an indication. For example, the UE 115 may be configured with a duration the UE 115 is to wait prior to transmitting an indication (e.g., a minimum time from the last measurement report, a minimum time between indications), or a maximum number of indications the UE 115 may transmit without reply from the network entity 105, or a combination thereof.

Figure 2:
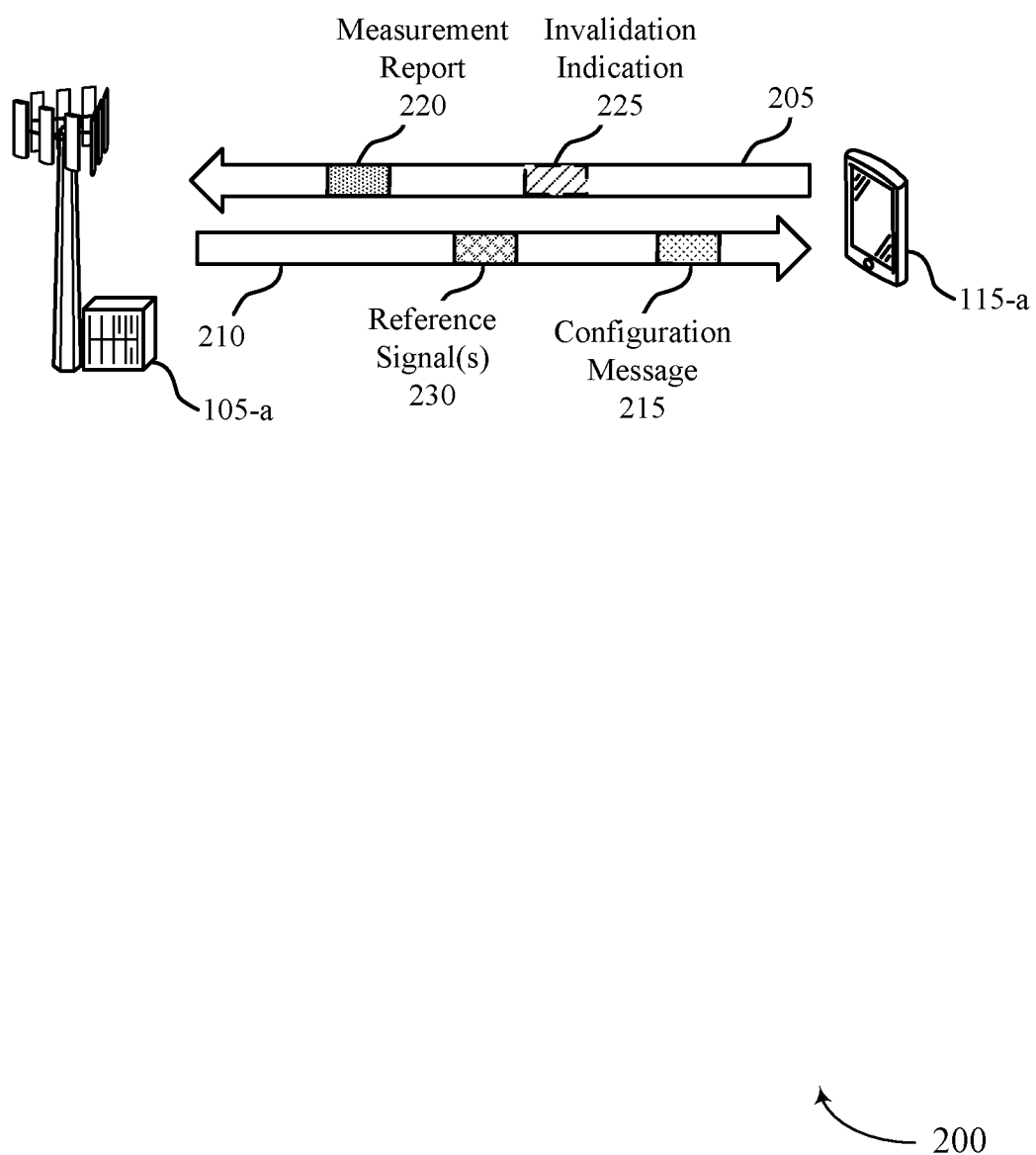

FIG. 2 illustrates an example of a wireless communications system 200 that supports techniques for invalidating a measurement report in accordance with one or more aspects of the present disclosure. Wireless communications system 200 illustrates the communications between a network entity 105-a and a UE 115-a. The network entity 105-a may be an example of a network entity 105 as described with reference to FIG. 1, and the UE 115-a may be an example of a UE 115 as described with reference to FIG. 1. The UE 115-a may connect to and communicate with the network entity 105-a using communication links 205 and 210 (e.g., uplink communication links, downlink communication links, channels, beams). The network entity 105-a may transmit a configuration message 215 and one or more reference signals 230 to the UE 115-a. The UE 115-a may transmit a measurement report 220 and an invalidation indication 225 to the network entity 105-a in accordance with the techniques described herein.

As described with reference to FIG. 1, to mitigate scenarios in which beam management procedures are performed based on obsolete measurement reports 220, the UE 115-a may be configured to update the status of one or more measurement reports 220 previously transmitted to the network entity 105-a. For example, the UE 115 may transmit an invalidation indication 225 to the network entity to in-validate, re-validate, or re-arrange one or more previously reported measurements of a measurement report 220.

The UE 115 may be configured with parameters associated with transmitting the invalidation indication 225. In some cases, the UE 115 may be preconfigured with the parameters, or may receive the parameters from a network device, such as a network entity 105 via DCI, MAC-CE, RRC, etc. For example, the network entity 105-a may transmit the configuration message 215 to the UE 115-a. The configuration message 215 may include configuration information associated with one or more reference signals (e.g., resources, reference signal type such a periodic, aperiodic, or semi-persistent), configuration information associated with measurement reports (e.g., triggers, resources, report type such a periodic, aperiodic, or semi-persistent), configuration information associated with transmitting a measurement report update, or a combination thereof. In some cases, the configuration message may indicate parameters associated with transmitting invalidation indication 225, such as how frequently the UE 115 may transmit an invalidation indication 225. For example, the configuration message 215 may include a configuration for a threshold (e.g., a minimum duration) of time between the configuration message 215 and the measurement report 220, a threshold of time (e.g., a minimum) between the measurement report 220 and the invalidation indication 225, a threshold of time (e.g., a minimum) between a first invalidation indication 225 and a second invalidation indication 225, etc.

Additional parameters indicated by the configuration message 215 may include a threshold number of invalidation indications 225 (e.g., a maximum number of indications) the UE 115-a may transmit without a reply (e.g., an acknowledgment message, a beam management message in response to the report, a request for an updated measurement report) from the network entity 105-a. In some examples, the configuration message 215 may indicate a duration of time the UE 115-a is to wait to receive a response from the network entity 105-a after the measurement report 220. The UE 115-a may be configured to transmit an invalidation indication 225 any time after the wait time if the UE 115-a did not receive a response from the network entity 105-a. In some examples, the configuration message 215 may include a measurement delta between a current measurement of a reference signal and a measurement of the reference single included in a previous measurement report 220, where exceeding the delta may be a trigger for the invalidation indication 225. For example, the delta may indicate a threshold change (e.g., maximum) between a measurement indicated in the measurement report 220 and a current measurement, and if the delta is exceeded, the UE 115-a may transmit the invalidation indication 225. In some examples, the configuration message 215 may include an invalidation message configuration that may configure the invalidation indication 225, such as the information included in the invalidation indication 225, the size of the indication, etc. In some other examples, the configuration message 215 may configure the measurement report 220 and the invalidation indication 225, which may be an invalidation message, or a separate invalidation configuration message may configure the invalidation indication 225. Any of the configuration and parameters associated with transmitting an invalidation indication 225 may be implemented alone or in any combination.

Accordingly, the UE 115-a may receive or otherwise identify a configuration for receiving and reporting on reference signals, and may receive or otherwise identify a configuration for transmitting an invalidation indication 225. The network entity 105-a may then transmit one or more reference signals 230 (e.g., CSI-RSs) to the UE 115-a. The UE 115-a may receive and measure the one or more reference signals 230. For example, the UE 115-a may measure RSRP, RSRQ, SINR, etc. for each of the one or more received reference signals. In some cases, the UE 115-a may identify a preferred beam for communications between the UE 115-a and the network entity 105-b based on the measurements. In some cases, the UE 115-a may rank the beams, or reference signals based on the measurements. The UE 115-a may then transmit a measurement report 220 indicative of the measurements, the ranking, the preferred beam, etc. In some cases, the measurement report 220 may explicitly indicate the measurements by including the measurements for each reference signals in the report. In some cases, the measurement report 220 may include measurements associated with a preferred (e.g., highest ranking, best) beam, and may include a differential for one or more lesser preferred beams with respect to the preferred beam.

The UE 115-a may continue to receive and perform measurements on the one or more reference signals 230 and may determine whether to transmit an invalidation indication 225. Determination to transmit the invalidation indication 225 may be based on the configuration message 215, and may be further described with reference to FIG. 3. For example, the UE 115-a may determine that measurements associated with one or more reference signals have changed since the last measurement report 220. Accordingly, the UE 115-a may transmit an invalidation indication 225 to the network entity 105-a to invalidate, revalidate, rearrange one or more previously reported measurement reports 220. The invalidation indication 225 may indicate to invalidate, revalidate, or rearrange parts of or all of the measurement report 220. For example, an indication to swap the two strongest measurements of the previous measurement report 220 may be an example of rearranging. In some cases, the network entity 105-a may reply to the UE 115-a with AP-CSI-RS measurements.

The invalidation indication 225 may include a payload. The payload indication may be one or more coded, or preconfigured bits (e.g., 1, 2). The bits may invalidate or revalidate a predefined measurement report (e.g., L1 report). For example, a bit value of 1 may invalidate the previous report (e.g., invalidate the measurement report 220). In some cases, the payload may indicate for the network entity 105-a to invalidate or revalidate the previous two measurement reports. In some cases, the invalidation indication 225 may include an identifier associated with a measurement report 220 for which the invalidation indication 225 is referencing. To invalidate, update, or re-validate a portion of a previous measurement report 220, the invalidation indication 225 may indicate resource setting identifiers (e.g., CSI reference signal resource indicator, SSBRI) indicative of which reference signals are invalidated, updated, re-validated. The invalidation indication 225 may include one or more updated measurements for one or more reference signals.

The UE 115-a may transmit the invalidation indication 225 using various resources. The resources used may be preconfigured uplink resources, such as PUCCH resources, random access channel (RACH) resource, etc. In some examples, the invalidation indication 225 may piggyback on an existing message. For example, the invalidation indication 225 may piggyback on an existing PUCCH message, such as a CSI PUCCH, scheduling request, etc. In some other examples, the invalidation indication 225 may piggyback on a PUSCH message, such as by using a MAC-CE, a demodulation reference signal (DMRS) sequence, or multiplexing. The invalidation indication 225 may be further described with reference to FIG. 3.

In some examples, prior to transmitting the invalidation indication 225 the UE 115-a may filter, or average, the measurements. Parameters associated with filtering may be specified or configured, such as by the configuration message 215, or the details may be determined by the UE 115-a. For example, the UE 115-a may be configured to average multiple measurements, and of the average satisfies a trigger, the UE 115-a may transmit the invalidation indication 225. In some cases, the UE 115-a may be configured to obtain a certain quantity of measurements for a reference signal prior to determining whether to transmit an invalidation indication 225. In some cases, the UE 115-a may be configured to average the certain quantity of measurements, to analyze the trend of the measurements, to compare each measurement separately to a threshold etc. to determine whether to transmit an invalidation indication 225.

In some cases, measurement hysteresis may be specified (e.g., by configuration message 215) or configured to mitigate unnecessary indications. For example, the UE 115-a may be configured with a duration (e.g., a minimum duration) of time to wait between reference signal measurements. In some cases, the UE 115-a may be configured with a maximum duration of time that UE 115-a may wait between reference signal measurements.

Accordingly, the UE 115-a may transmit a measurement report 220 to the network entity 105-a indicative of measurements associated with one or more reference signals. The UE 115-*a* may determine that at least a portion of the measurement report 220 is obsolete and may transmit the invalidation indication 225. Accordingly, the network entity 105-*a* may receive the measurement report 220 and the invalidation indication 225 and may determine whether to perform beam management procedures based on the measurement report 220, the invalidation indication 225, or both. In some cases, the network entity 105-*a* may transmit a request for the UE 115-*a* to transmit an updated measurement report 220 based on the invalidation indication 225.

In some cases, the UE 115-*a* may transmit an invalidation indication 225 to invalidate at least a portion of a measurement report 220. The UE 115-*a* may continue measuring the reference signals 230 and may determine that current measurements match one or more measurement included in the measurement report 220. In such cases, the UE 115-*a* may transmit a second invalidation indication 225 to re-validate the measurement report 220.

Figure 3:
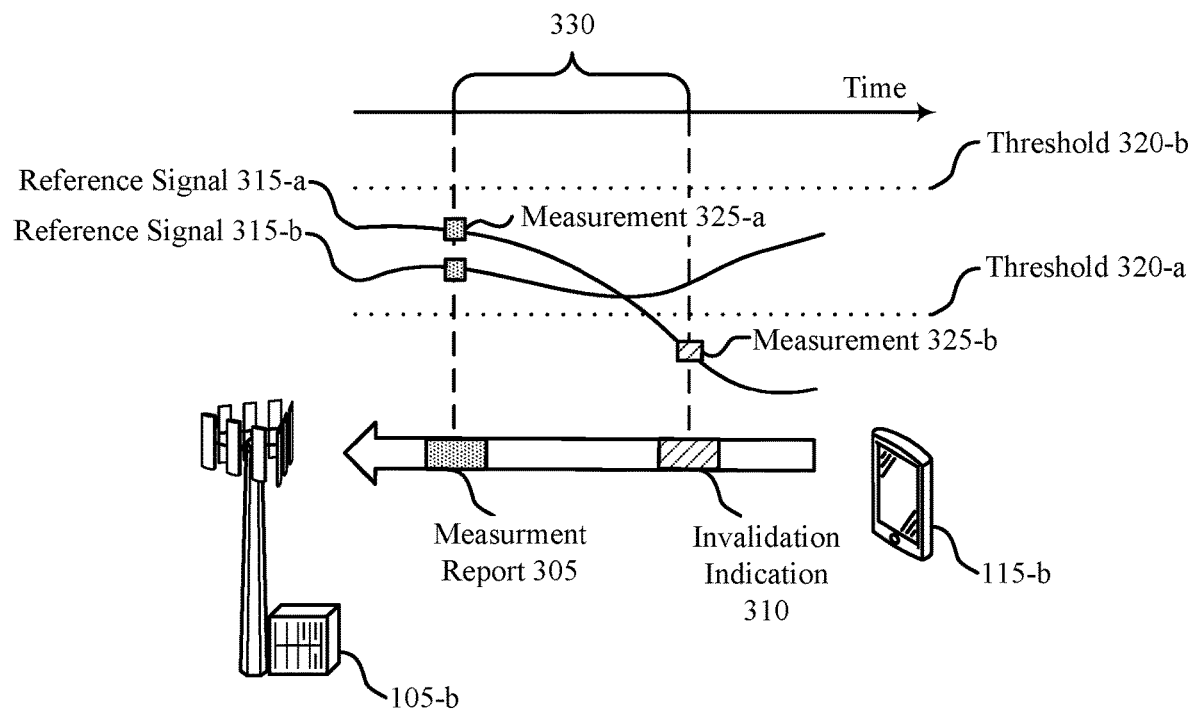

FIG. 3 illustrates an example of a wireless communications system 300 that supports techniques for invalidating a measurement report in accordance with one or more aspects of the present disclosure. Wireless communications system 300 illustrates the communications of beam measurements between a network entity 105-*b* and a UE 115-*b*. The network entity 105-*b* may be an example of the network entity 105 as described with reference to FIGS. 1 and 2, and the UE 115-*b* may be an example of the UE 115 as described with reference to FIGS. 1 and 2. As described herein, the UE 115-*b* may transmit, to network entity 105-*b*, a measurement report 305, which may be an example of the measurement report 220 as described with reference to FIG. 2, and an invalidation indication 310, which may be an example of the invalidation indication 225 as described with reference to FIG. 2.

Reference signal 315-*a* (e.g., a CSI-RS) and reference signal 315-*b* (e.g., a CSI-RS) may be examples of one or more signals received and measured by the UE 115-*b*. The UE 115-*b* may perform measurement 325-*a* of reference signal 315-*a* and transmit the measurement as part of the measurement report 305. The measurement report 305 may include other measurements, such as one or more measurements of reference signal 315-*b* or additional measurements of reference signal 315-*a*, or measurements associated with other reference signals 315.

In some cases, the UE 115-*b* may continually measure the reference signals 315-*a* and 315-*b*. In some cases, the UE 115-*b* may be configured to measure the reference signals 315 after a duration 330. For example, after the duration 330, the UE 115-*b* may perform additional measurements of both the reference signal 315-*a* and the reference signal 315-*b* and may determine whether to transmit an invalidation indication 310. In some cases, the UE 115-*b* may continually determine whether to transmit an invalidation indication 310, or may be configured to wait until after duration 330. In some cases, the earliest the UE 115-*b* may transmit the invalidation indication after the measurement report 305 is upon expiration of duration 330.

Threshold 320-*a* (e.g., a minimum) and threshold 320-*b* (e.g., a maximum) may be values indicating to the UE 115-*b* when to transmit the invalidation indication 310. In some cases, thresholds may indicate to the UE 115-*b* which measurements to indicate in the invalidation indication 310. For example, the UE 115-*b* may perform measurement 325-*b*, which may not satisfy the threshold 320-*a* (e.g., measurement 325-*a* is below the threshold 320-*a*). Accordingly, the UE 115-*b* may transmit an indication of the measurement 325-*b* or otherwise indicate as part of the invalidation indication 310 to the network entity 105-*b* that at least reference signal 315-*a* in measurement report 305 is invalid.

In some implementations, the UE 115-*a* may determine whether the ranking of reference signals 315 has changed since transmission of the measurement report 305. For example, measurement report 305 may indicate that reference signal 315-*a* is associated with a preferred beam and that reference signal 315-*b* is associated with a lesser preferred beam based on reference signal 315-*a* being associated with a higher measurement 325 than reference signal 315-*b*. Then, sometime after transmitting measurement report 305, such as after duration 330, the UE 115-*a* may determine that reference signal 315-*b* is now associated with the preferred beam, that reference signals 315-*a* and 315-*b* swapped ranks, that reference signal 315-*a* is no longer associated with the preferred beam, etc. Accordingly, the UE 115-*b* may indicate as part of the invalidation indication 310 to the network entity 105-*b* that reference signal 315-*a* in measurement report 305 is invalid, that reference signal 315-*b* in measurement report 305 is invalid, or both. In some cases, the UE 115-*b* may indicate in invalidation indication 310 that reference signal 315-*a* and 315-*b* swapped ranks. In such cases, the network entity 105-*b* may use the invalidation indication 310 to perform beam managements procedures, such as without requesting for an updated measurement report 305 from the UE 115-*b*.

Figure 4:
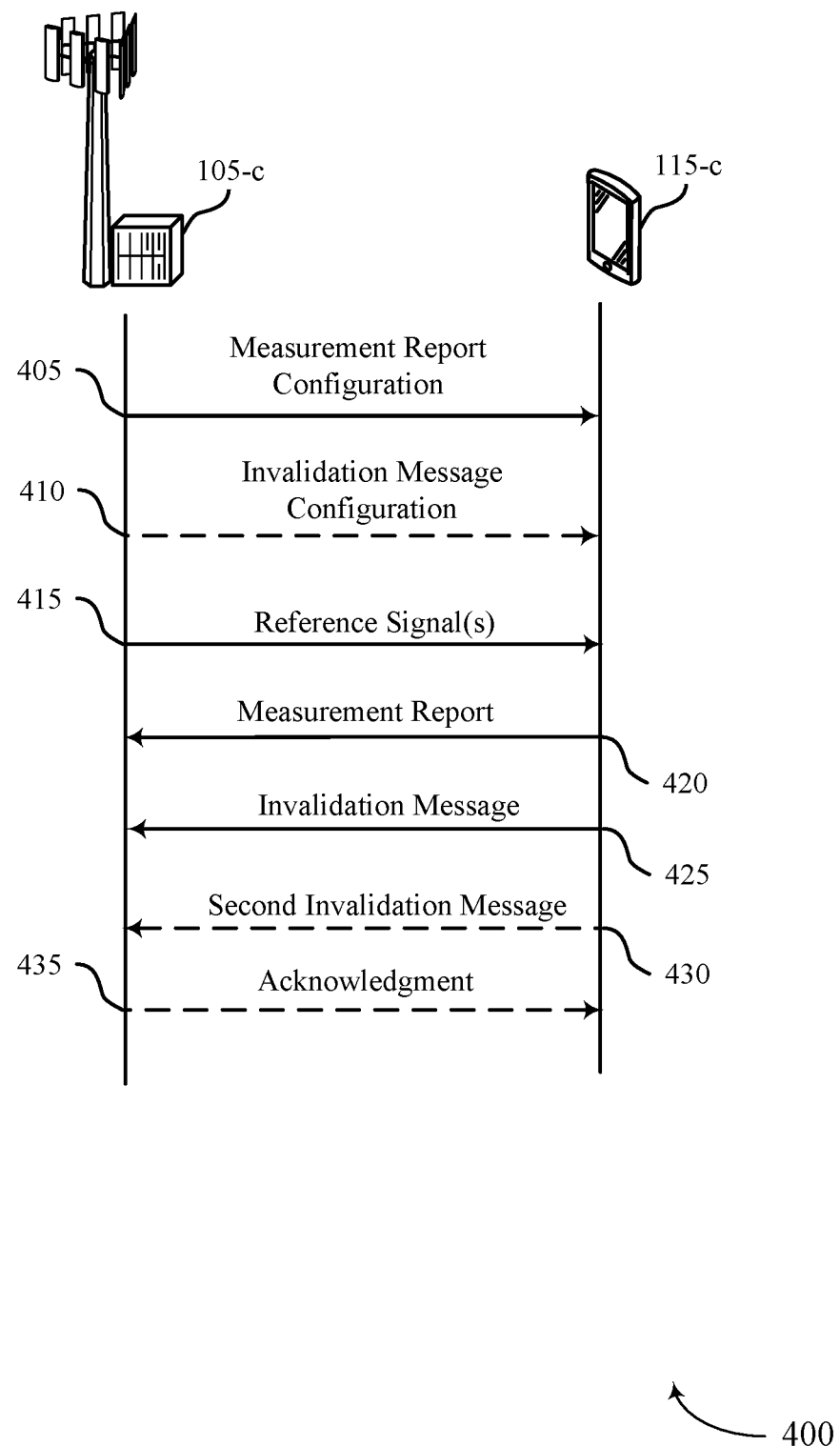
FIG. 4 illustrates an example of a process flow diagram that supports techniques for invalidating a measurement report in accordance with one or more aspects of the present disclosure.

FIG. 4 illustrates an example of a process flow diagram 400 that supports techniques for invalidating a measurement report in accordance with one or more aspects of the present disclosure. Process flow diagram 400 illustrates the communications of measurement report information and configurations between a network entity 105-*c* and a UE 115-*c*. The network entity 105-*c* may be an example of the network entity 105 as described with reference to FIGS. 1 through 3, and the UE 115-*c* may be an example of the UE 115 as described with reference to FIGS. 1 through 3.

At 405, the network entity 105-*c* (e.g., network node, gNB) may transmit a measurement report configuration to the UE 115-*c*. The measurement report configuration may be an example of the configuration message 215 as described with reference to FIG. 2. The configuration may be a message indicating a set of parameters associated with transmission of a measurement report.

At 410, the network entity 105-*c* may transmit an invalidation message configuration to the UE 115-*c*. The invalidation message configuration may configure an invalidation message at 425, the second invalidation message at 430, or both. The invalidation message configuration may be a part of, or separate from, the measurement report configuration at 405. For example, the network entity 105-*c* may configure the measurement report at 420 and the invalidation message at 435 in the same measurement report configuration at 405, or may send an additional invalidation message configuration at 410.

The UE 115-*c* may receive an indication of a duration after transmission of the measurement report the UE 115-*c* is to refrain from transmitting the invalidation message, an indication of a duration between the set of measurements and subsequent measurements, where the UE 115-*c* is to refrain from measuring the one or more reference signals in the duration, a duration after transmission of the invalidation message the UE 115-*c* is to refrain from transmitting a second invalidation message, or a combination thereof. The indication of the durations may be one or more messages including one or more of the durations.

The indication of the one or more durations may be a part of the measurement report configuration, the invalidation message configuration, the reference signal(s), or another message or transmission. For example, a separate message indicating one or more durations may be after the measurement report configuration, after the invalidation message configuration, after the reference signal(s), after the measurement report, after the invalidation message, or before or after another message or transmission. In some examples, the indication of the one or more durations may be preconfigured.

The UE 115-c may receive an indication of a maximum number of invalidation messages allowed to be transmitted by the UE 115-c prior to reception of a response to one or more invalidation messages from the network entity 105-c. For example, the indication may indicate the maximum number of invalidation messages at 425 and 430 the UE 115-c may transmit before receiving an acknowledgment at 435 from the network entity 105-c. The indication of the maximum number of invalidation messages may be a part of the measurement report configuration, the invalidation message configuration, the reference signal(s), or another message or transmission. For example, a separate message indicating the maximum number of invalidation messages may be after the measurement report configuration, after the invalidation message configuration, after the reference signal(s), after the measurement report, after the invalidation message, or before or after another message or transmission. In some examples, the maximum number of invalidation messages may be preconfigured.

The UE 115-c may receive an indication of a trigger for transmission of the invalidation message, the trigger being a delta between a first measurement of a reference signal and subsequent measurement of the reference signal. In some examples, the trigger may be that subsequent measurements of at least two reference signals result in the at least two reference signals being ranked differently than a rank-order included in the measurement report. The indication of the trigger may be a part of the measurement report configuration, the invalidation message configuration, the reference signal(s), or another message or transmission. For example, a separate message indicating the trigger may be after the measurement report configuration, after the invalidation message configuration, after the reference signal(s), after the measurement report, after the invalidation message, or before or after another message or transmission. In some examples, the trigger may be preconfigured.

At 415, the network entity 105-c may transmit, and the UE 115-c may receive, one or more reference signals. The reference signals at 415 may be an example of the reference signals 230 as described with reference to FIG. 2.

At 420, the UE 115-c may transmit a measurement report to the network entity 105-c, where the measurement report may be an example of the measurement report 220 as described with reference to FIG. 2. The measurement report may be transmitted according to the measurement report configuration and the set of parameters. The measurement report may indicate a set of measurements associated with the one or more reference signals received by the UE 115-c.

At 425, the UE 115-c may transmit an invalidation message to the network entity 105-c, where the invalidation message may be an example of the invalidation indication 225 as described with reference to FIG. 2. The invalidation message may be based on the invalidation message configuration. The invalidation message may indicate that at least a portion of the measurement report is invalid based on a subsequent measurement associated with the one or more reference signals differing by a threshold amount from a corresponding measurement of the set of measurements. The invalidation may include an indication to rearrange the one or more reference signals in the measurement report, where the indication to rearrange the one or more reference signals includes transmitting an indication to switch a highest-ranked reference signal to a different rank. For example, rearranging the one or more reference signals may include switching a highest-ranked reference signal to a second-highest rank, and switching a second-highest ranked reference signal to a highest-rank.

In some cases, the UE 115-c may perform filtering of the subsequent measurement associated with the one or more reference signals, where transmission of the invalidation message may be based at least in part on the filtering.

In some examples, the invalidation message may include: an indication to rearrange the one or more reference signals in the measurement report, an indication to switch a highest-ranked reference signal to a different rank, an indication to invalidate an entirety of the measurement report; a set of one or more bits to indicate that the measurement report is invalidated in entirety (e.g., one bit, or two bits to indicate that the measurement report is invalidated in entirety); one or more identifiers associated with at least one of the one or more reference signals that are invalid; an indication of an action from a set of actions associated with the invalidation message, where the set of actions may include invalidation, re-validation, and rearranging; an indication to invalidate one or more measurement reports.

In some cases, the invalidation message may be included in an uplink control channel message (e.g., PUCCH), an uplink shared channel message (e.g., PUSCH), or a RACH message, or a combination thereof.

In some examples, the UE 115-c may receive, in response to the invalidation message, a request to transmit a second measurement report comprising updated measurements associated with one or more of the reference signals. The second measurement report may be an aperiodic measurement report.

The network entity 105-c may perform a beam management procedure based at least in part on the measurement report, the invalidation message, an updated measurement report, or a combination thereof.

At 430, the UE 115-c may transmit a second invalidation message to the network entity 105-c. The second invalidation message may indicate that at least the portion of the measurement report is re-validated. In some examples, the second invalidation message may include one or more identifiers associated with at least one of the one or more reference signals that are re-validated, a set of one or more bits (e.g., one bit, or two bits) to indicate that an entirety of the measurement report is re-validated. A threshold amount of time (e.g., a minimum) may be configured between the second invalidation message 430 and the acknowledgment 425.

At 435, the network entity 105-c may transmit an acknowledgement to the UE 115-c. The UE 115-c may be configured with a maximum number of reports, or messages, that may be sent before receiving the acknowledgment from the network entity 105-c, before receiving a request for an updated report, or before receiving some other message from the network entity 105-c. Thus, in some examples, the network entity 105-c may transmit an acknowledgment to the UE 115-c to facilitate continued communication of measurement reports.

Figure 5:
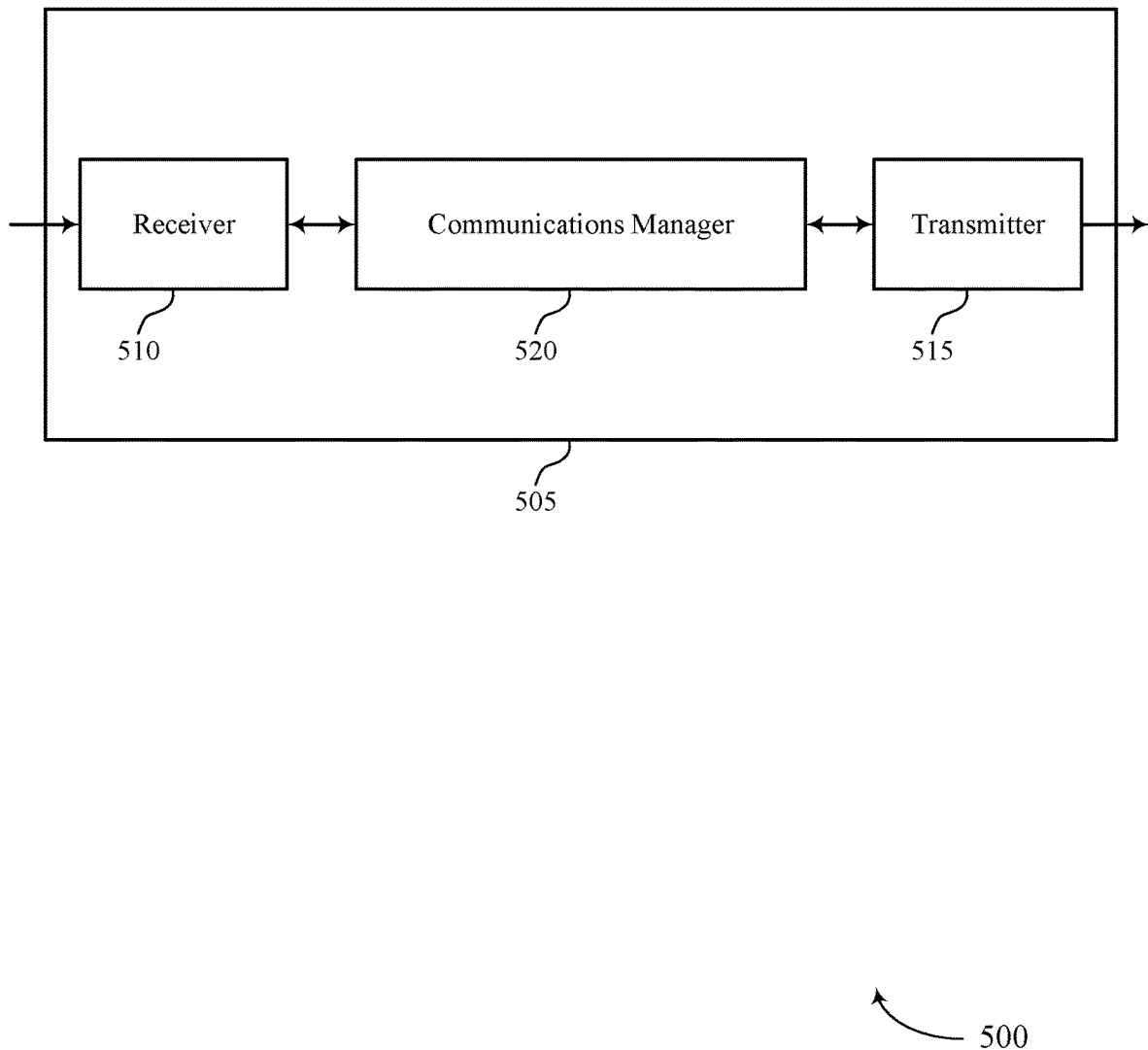
FIGS. 5 and 6 show block diagrams of devices that support techniques for invalidating a measurement report in accordance with one or more aspects of the present disclosure.

FIG. 5 shows a block diagram 500 of a device 505 that supports techniques for invalidating a measurement report in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for invalidating a measurement report). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for invalidating a measurement report). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for invalidating a measurement report as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving a message indicative of a set of parameters associated with transmission of a measurement report. The communications manager 520 may be configured as or otherwise support a means for receiving one or more reference signals. The communications manager 520 may be configured as or otherwise support a means for transmitting, in accordance with the set of parameters, the measurement report indicating a set of measurements associated with the one or more reference signals received by the UE. The communications manager 520 may be configured as or otherwise support a means for transmitting an invalidation message indicating that at least a portion of the measurement report is invalid based on a subsequent measurement associated with the one or more reference signals differing from a corresponding measurement from the set of measurements.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for invalidating a measurement report, which may result in reduced processing, reduced power consumption (e.g., at the UE or at the network entity), reduced latency, reduced overhead, or more efficient utilization of communication resources.

Figure 6:
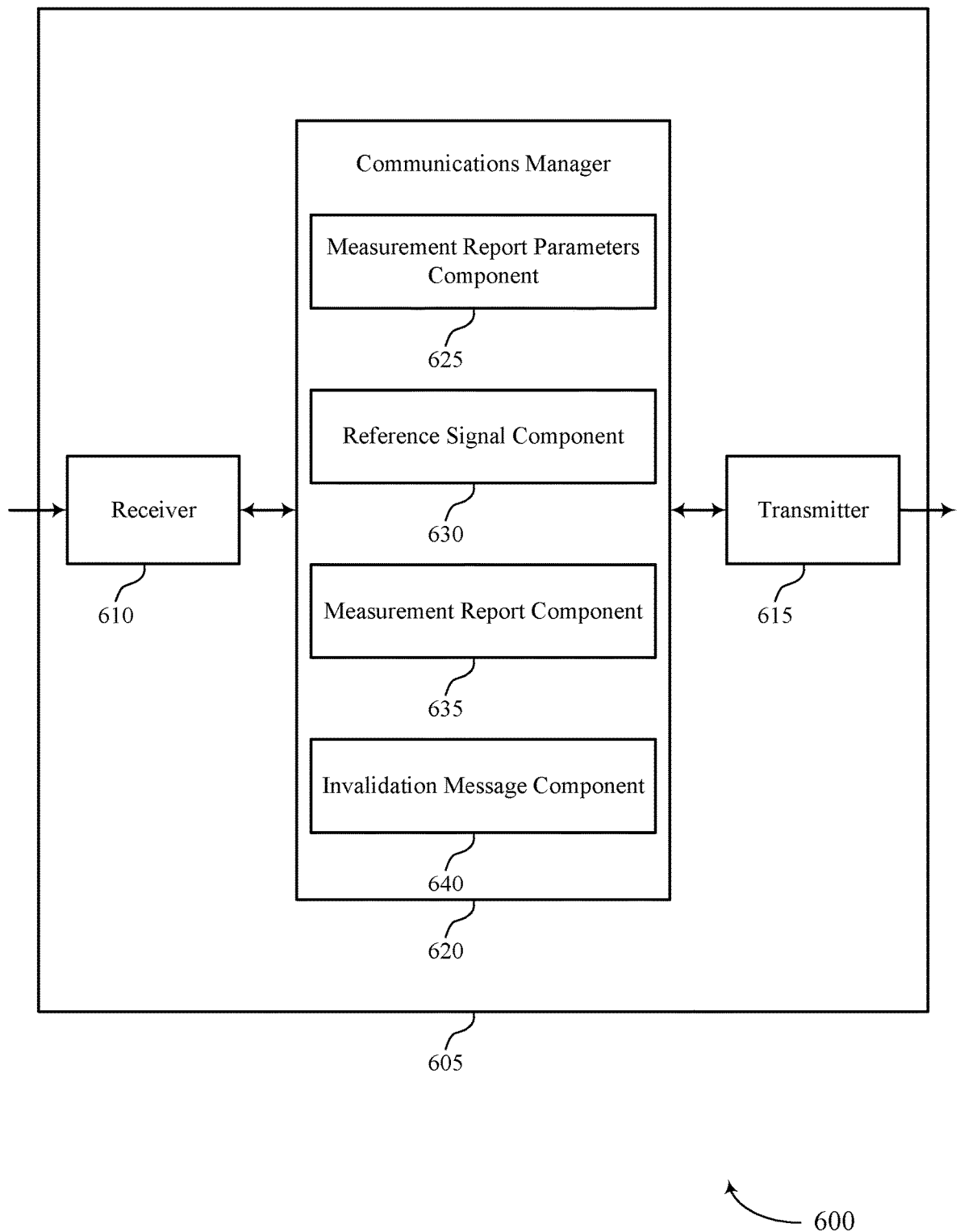

FIG. 6 shows a block diagram 600 of a device 605 that supports techniques for invalidating a measurement report in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for invalidating a measurement report). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for invalidating a measurement report). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for invalidating a measurement report as described herein. For example, the communications manager 620 may include a measurement report parameters component 625, a reference signal component 630, a measurement report component 635, an invalidation message component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The measurement report parameters component 625 may be configured as or otherwise support a means for receiving a message indicative of a set of parameters associated with transmission of a measurement report. The reference signal component 630 may be configured as or otherwise support a means for receiving one or more reference signals. The measurement report component 635 may be configured as or otherwise support a means for transmitting, in accordance with the set of parameters, the measurement report indicating a set of measurements associated with the one or more reference signals received by the UE. The invalidation message component 640 may be configured as or otherwise support a means for transmitting an invalidation message indicating that at least a portion of the measurement report is invalid based on a subsequent measurement associated with the one or more reference signals differing from a corresponding measurement from the set of measurements.

Figure 7:
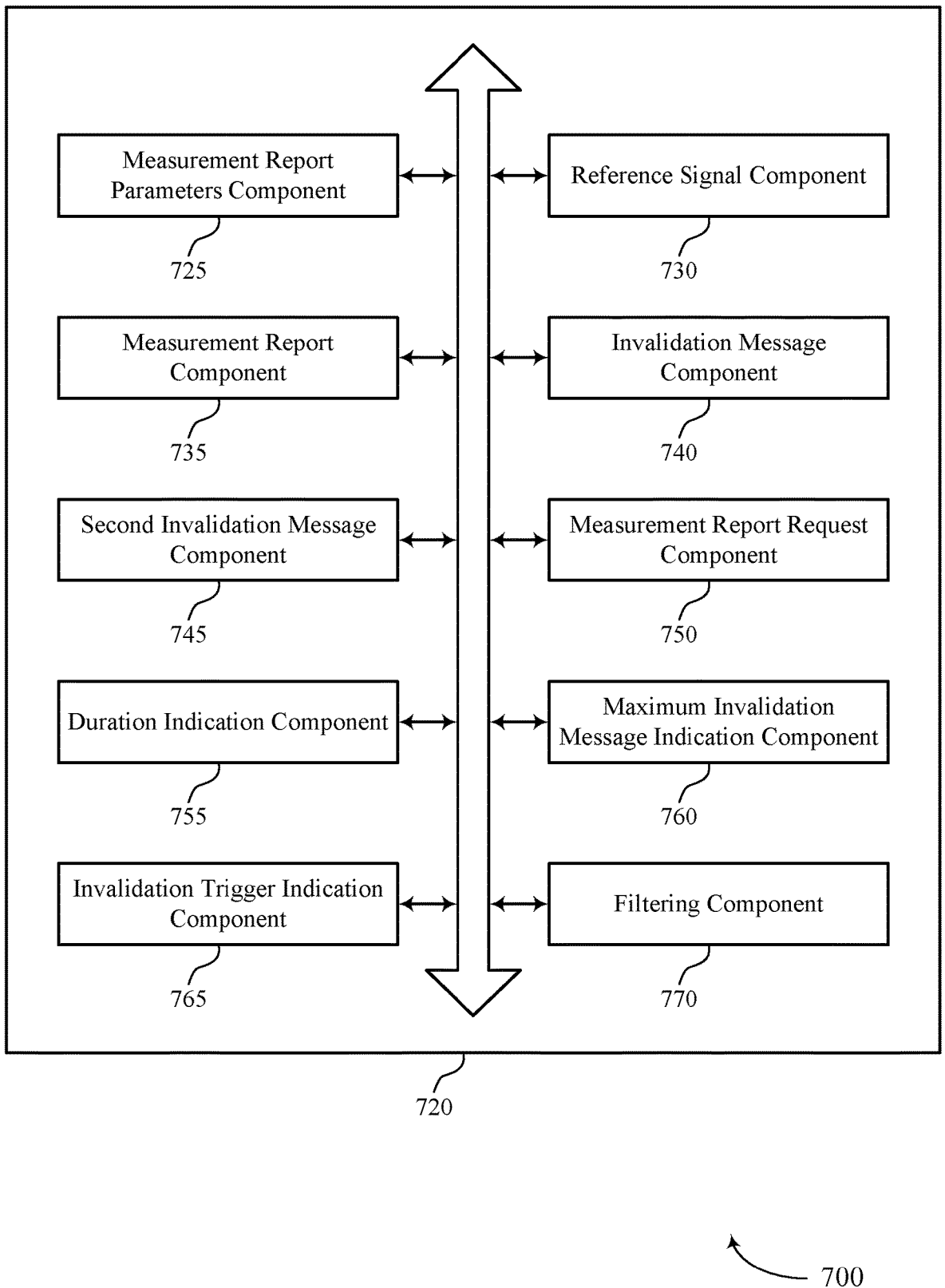
FIG. 7 shows a block diagram of a communications manager that supports techniques for invalidating a measurement report in accordance with one or more aspects of the present disclosure.

FIG. 7 shows a block diagram 700 of a communications manager 720 that supports techniques for invalidating a measurement report in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for invalidating a measurement report as described herein. For example, the communications manager 720 may include a measurement report parameters component 725, a reference signal component 730, a measurement report component 735, an invalidation message component 740, a second invalidation message component 745, a measurement report request component 750, a duration indication component 755, a maximum invalidation message indication component 760, an invalidation trigger indication component 765, a filtering component 770, or any combination thereof. Each of these components may communicate, directly or indirectly, with one another (e.g., via one or more buses).

The communications manager 720 may support wireless communications at a UE in accordance with examples as disclosed herein. The measurement report parameters component 725 may be configured as or otherwise support a means for receiving a message indicative of a set of parameters associated with transmission of a measurement report. The reference signal component 730 may be configured as or otherwise support a means for receiving one or more reference signals. The measurement report component 735 may be configured as or otherwise support a means for transmitting, in accordance with the set of parameters, the measurement report indicating a set of measurements associated with the one or more reference signals received by the UE. The invalidation message component 740 may be configured as or otherwise support a means for transmitting an invalidation message indicating that at least a portion of the measurement report is invalid based on a subsequent measurement associated with the one or more reference signals differing from a corresponding measurement from the set of measurements.

In some examples, to support transmitting the invalidation message, the invalidation message component 740 may be configured as or otherwise support a means for transmitting an indication to re-arrange the one or more reference signals in the measurement report.

In some examples, re-arranging the one or more reference signals includes switching a highest-ranked reference signal to a second-highest rank, and switching a second-highest ranked reference signal to a highest-rank.

In some examples, to support transmitting the invalidation message, the invalidation message component 740 may be configured as or otherwise support a means for transmitting an indication to in-validate an entirety of the measurement report.

In some examples, the invalidation message includes one bit, or two bits to indicate that the measurement report is invalidated in entirety.

In some examples, to support transmitting the invalidation message, the invalidation message component 740 may be configured as or otherwise support a means for transmitting identifiers of the one or more reference signals that are invalid.

In some examples, the second invalidation message component 745 may be configured as or otherwise support a means for transmitting, subsequent to the invalidation message, a second invalidation message indicating that at least the portion of the measurement report is re-validated.

In some examples, to support transmitting the second invalidation message, the second invalidation message component 745 may be configured as or otherwise support a means for transmitting one or more identifiers associated with at least one of the one or more reference signals that are re-validated.

In some examples, to support transmitting the second invalidation message, the second invalidation message component 745 may be configured as or otherwise support a means for transmitting a set of one or more bits to indicate that an entirety of the measurement report is re-validated.

In some examples, to support transmitting the invalidation message, the invalidation message component 740 may be configured as or otherwise support a means for transmitting an indication of an action from a set of actions associated with the invalidation message, the set of actions including invalidation, re-validation, and re-arranging.

In some examples, the measurement report request component 750 may be configured as or otherwise support a means for receiving, in response to the invalidation message, a request to transmit a second measurement report including updated measurements associated with one or more of the reference signals.

In some examples, the second measurement report is an aperiodic measurement report.

In some examples, to support transmitting the invalidation message, the invalidation message component 740 may be configured as or otherwise support a means for transmitting an indication to invalidate a set of multiple measurement reports.

In some examples, the duration indication component 755 may be configured as or otherwise support a means for receiving an indication of a duration after transmission of the measurement report the UE is to refrain from transmitting the invalidation message.

In some examples, the duration indication component 755 may be configured as or otherwise support a means for receiving an indication of a duration after transmission of the invalidation message the UE is to refrain from transmitting a second invalidation message.

In some examples, the maximum invalidation message indication component 760 may be configured as or otherwise support a means for receiving an indication of a maximum number of invalidation messages allowed to be transmitted by the UE prior to reception of a response to one or more invalidation messages.

In some examples, the invalidation trigger indication component 765 may be configured as or otherwise support a means for receiving an indication of a trigger for transmission of the invalidation message, the trigger being a delta between a first measurement of a reference signal and subsequent measurement of the reference signal.

In some examples, the invalidation trigger indication component 765 may be configured as or otherwise support a means for receiving an indication of a trigger for transmission of the invalidation message, the trigger being that subsequent measurements of at least two reference signals result in the at least two reference signals being ranked differently than a rank-order included in the measurement report.

In some examples, the duration indication component 755 may be configured as or otherwise support a means for receiving an indication of a duration between the set of measurements and subsequent measurements, where the UE is to refrain from measuring the one or more reference signals in the duration.

In some examples, to support transmitting the invalidation message, the invalidation message component 740 may be configured as or otherwise support a means for transmitting an uplink control channel message, an uplink shared channel message, or a RACH message including the invalidation message.

In some examples, the filtering component 770 may be configured as or otherwise support a means for performing filtering of the subsequent measurement associated with the one or more reference signals, where transmission of the invalidation message is based on the filtering.

Figure 8:
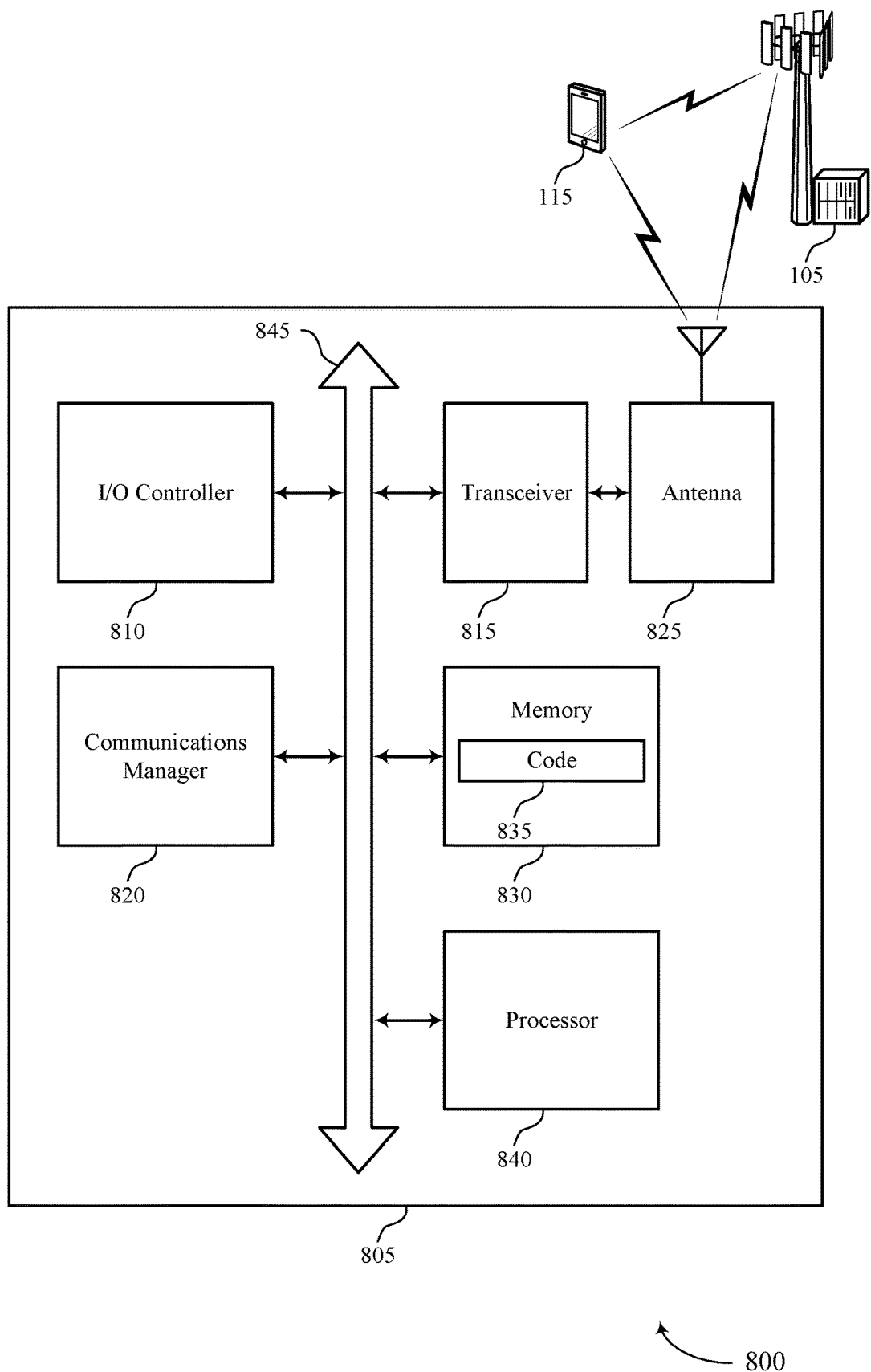
FIG. 8 shows a diagram of a system including a device that supports techniques for invalidating a measurement report in accordance with one or more aspects of the present disclosure.

FIG. 8 shows a diagram of a system 800 including a device 805 that supports techniques for invalidating a measurement report in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for invalidating a measurement report). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a message indicative of a set of parameters associated with transmission of a measurement report. The communications manager 820 may be configured as or otherwise support a means for receiving one or more reference signals. The communications manager 820 may be configured as or otherwise support a means for transmitting, in accordance with the set of parameters, the measurement report indicating a set of measurements associated with the one or more reference signals received by the UE. The communications manager 820 may be configured as or otherwise support a means for transmitting an invalidation message indicating that at least a portion of the measurement report is invalid based on a subsequent measurement associated with the one or more reference signals differing from a corresponding measurement from the set of measurements.

By including or configuring the communications manager 820 in accordance with examples as described herein, the device 805 may support techniques for invalidating a measurement report, which may result in improved communication reliability, reduced latency, improved user experience related to reduced processing, reduced power consumption, more efficient utilization of communication resources, improved coordination between devices, longer battery life, or improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for invalidating a measurement report as described herein, or the processor 840 and the memory 830 may be otherwise configured to perform or support such operations.

Figure 9:
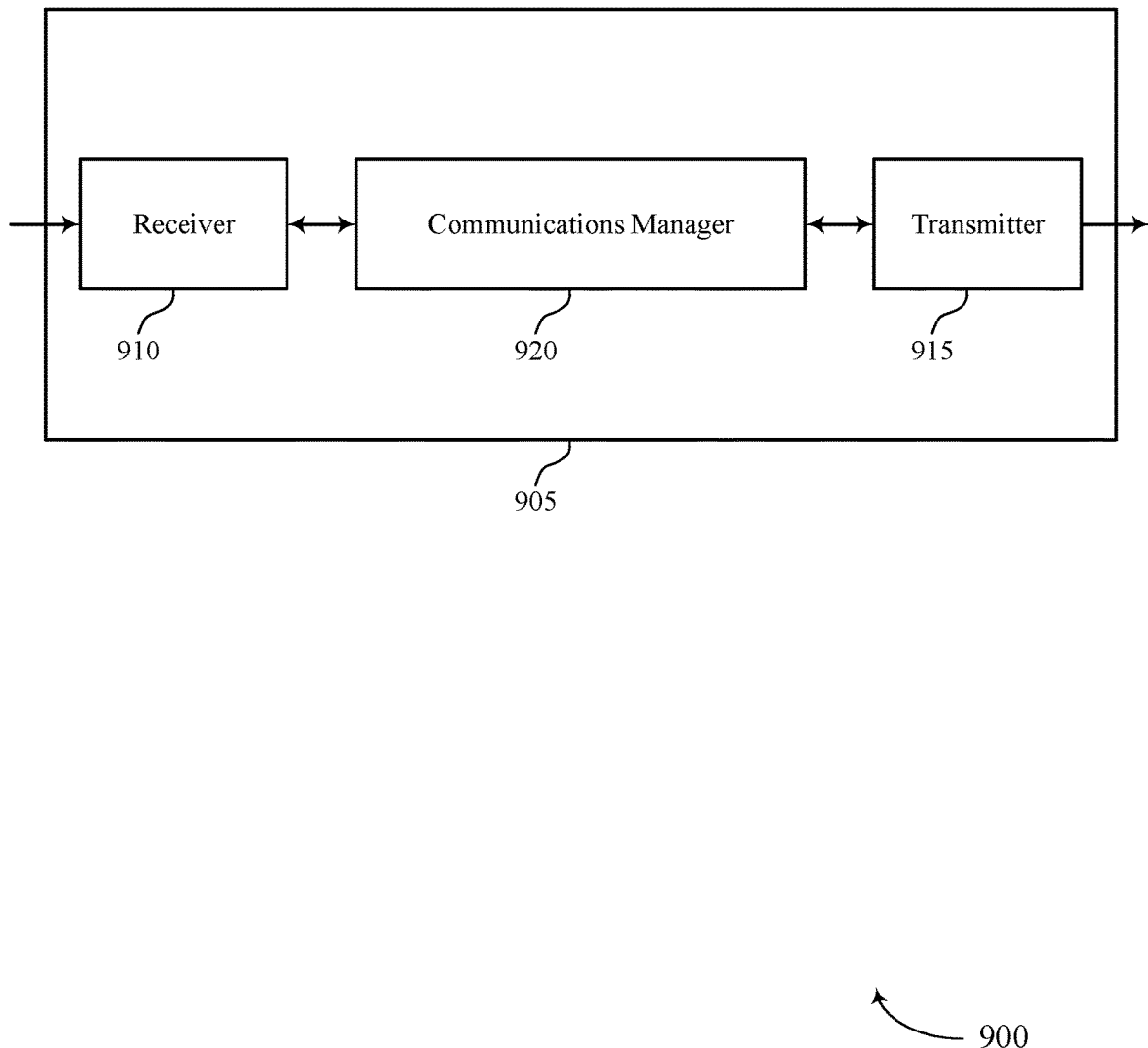
FIGS. 9 and 10 show block diagrams of devices that support techniques for invalidating a measurement report in accordance with one or more aspects of the present disclosure.

FIG. 9 shows a block diagram 900 of a device 905 that supports techniques for invalidating a measurement report in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for invalidating a measurement report as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting a message indicative of a set of parameters associated with transmission of a measurement report by a UE. The communications manager 920 may be configured as or otherwise support a means for transmitting one or more reference signals. The communications manager 920 may be configured as or otherwise support a means for receiving, in accordance with the set of parameters, the measurement report indicating a set of measurements associated with the one or more reference signals received by the UE. The communications manager 920 may be configured as or otherwise support a means for receiving an invalidation message indicating that at least a portion of the measurement report is invalid based on a subsequent measurement associated with the one or more reference signals differing from a corresponding measurement from the set of measurements.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for invalidating a measurement report, which may result in reduced processing, reduced power consumption (e.g., at the UE or at the network entity), reduced latency, reduced overhead, or more efficient utilization of communication resources.

Figure 10:
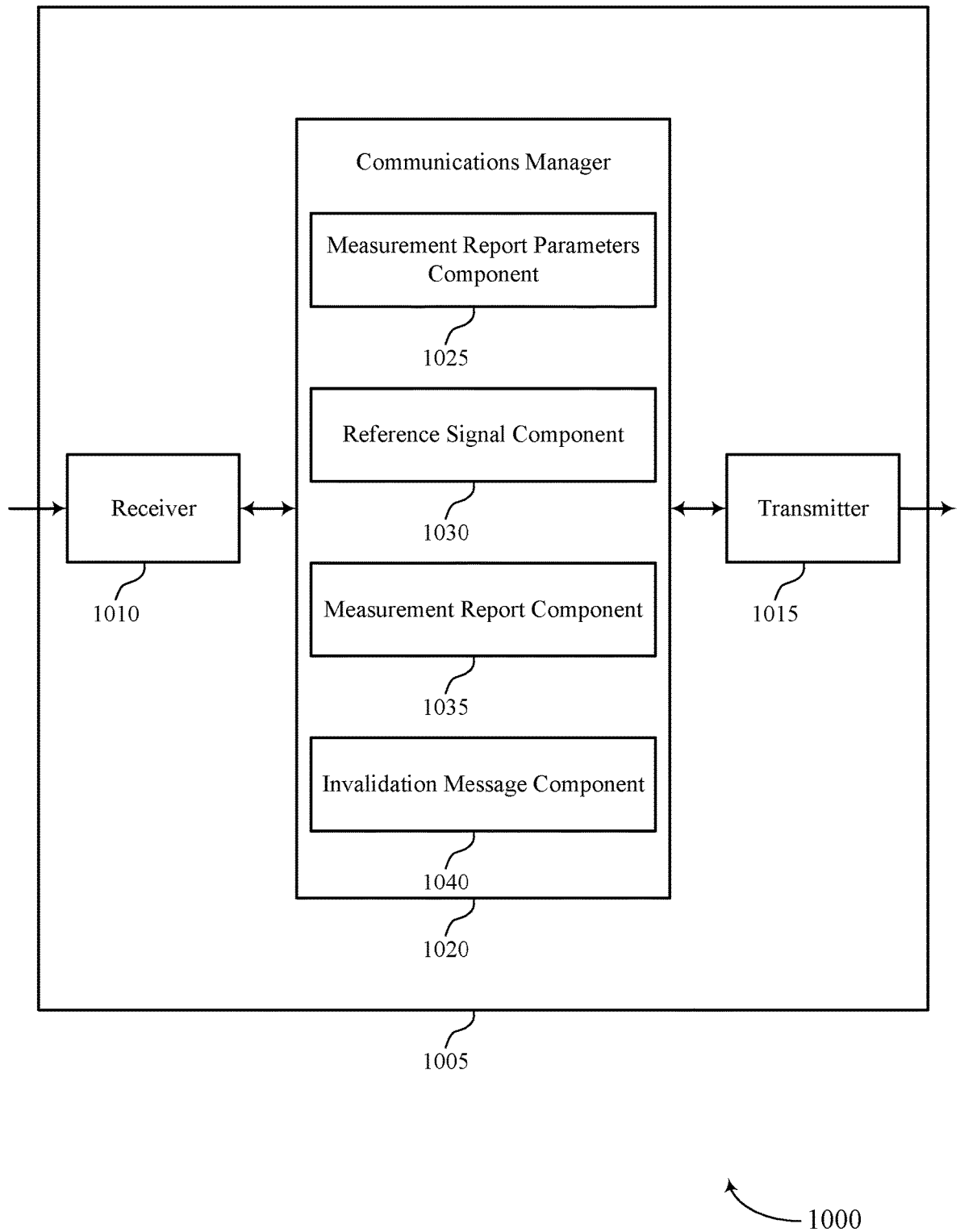

FIG. 10 shows a block diagram 1000 of a device 1005 that supports techniques for invalidating a measurement report in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for invalidating a measurement report as described herein. For example, the communications manager 1020 may include a measurement report parameters component 1025, a reference signal component 1030, a measurement report component 1035, an invalidation message component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The measurement report parameters component 1025 may be configured as or otherwise support a means for transmitting a message indicative of a set of parameters associated with transmission of a measurement report by a UE. The reference signal component 1030 may be configured as or otherwise support a means for transmitting one or more reference signals. The measurement report component 1035 may be configured as or otherwise support a means for receiving, in accordance with the set of parameters, the measurement report indicating a set of measurements associated with the one or more reference signals received by the UE. The invalidation message component 1040 may be configured as or otherwise support a means for receiving an invalidation message indicating that at least a portion of the measurement report is invalid based on a subsequent measurement associated with the one or more reference signals differing from a corresponding measurement from the set of measurements.

Figure 11:
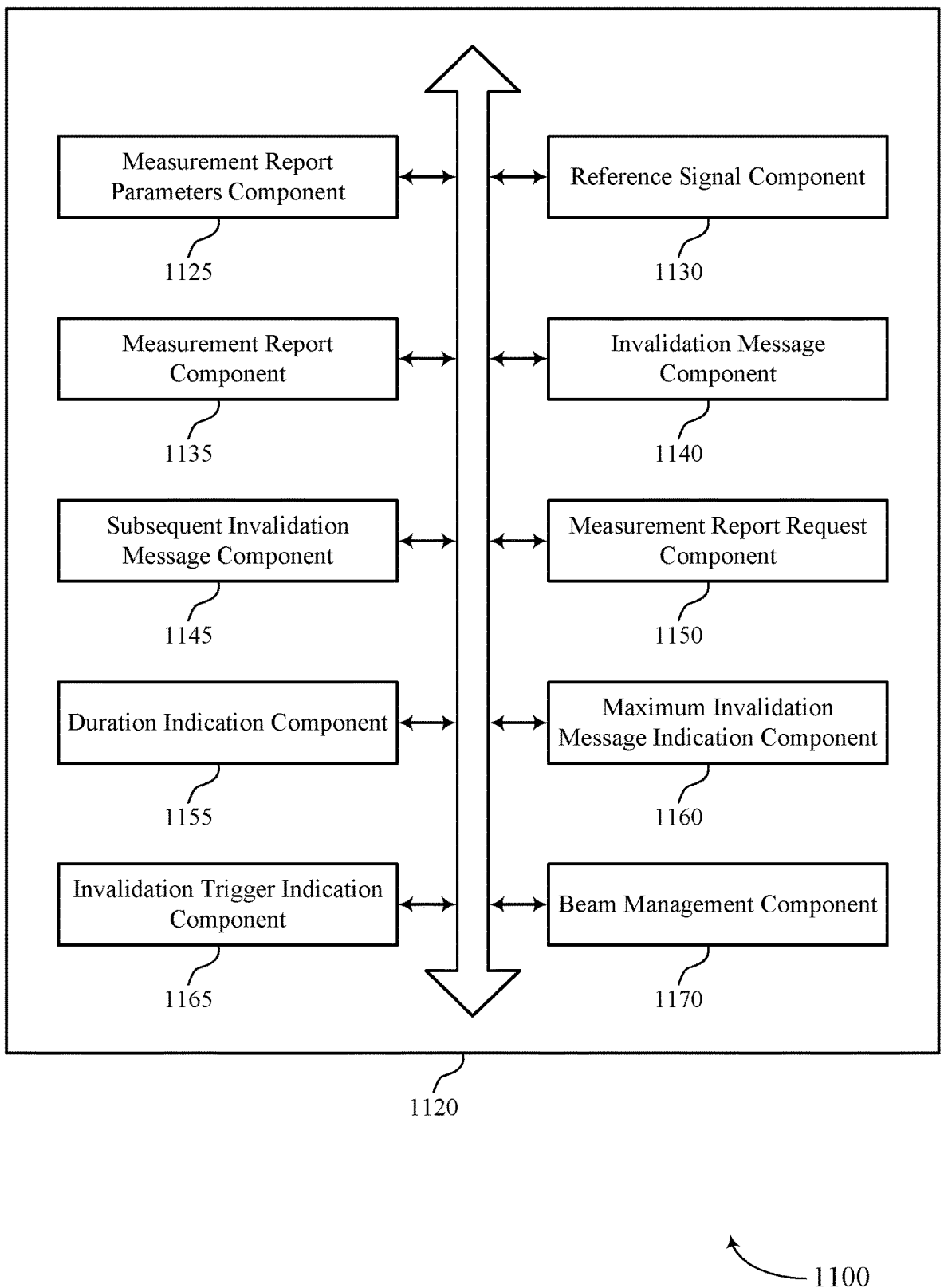
FIG. 11 shows a block diagram of a communications manager that supports techniques for invalidating a measurement report in accordance with one or more aspects of the present disclosure.

FIG. 11 shows a block diagram 1100 of a communications manager 1120 that supports techniques for invalidating a measurement report in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for invalidating a measurement report as described herein. For example, the communications manager 1120 may include a measurement report parameters component 1125, a reference signal component 1130, a measurement report component 1135, an invalidation message component 1140, a subsequent invalidation message component 1145, a measurement report request component 1150, a duration indication component 1155, a maximum invalidation message indication component 1160, an invalidation trigger indication component 1165, a beam management component 1170, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The measurement report parameters component 1125 may be configured as or otherwise support a means for transmitting a message indicative of a set of parameters associated with transmission of a measurement report by a UE. The reference signal component 1130 may be configured as or otherwise support a means for transmitting one or more reference signals. The measurement report component 1135 may be configured as or otherwise support a means for receiving, in accordance with the set of parameters, the measurement report indicating a set of measurements associated with the one or more reference signals received by the UE. The invalidation message component 1140 may be configured as or otherwise support a means for receiving an invalidation message indicating that at least a portion of the measurement report is invalid based on a subsequent measurement associated with the one or more reference signals differing from a corresponding measurement from the set of measurements.

In some examples, to support receiving the invalidation message, the invalidation message component 1140 may be configured as or otherwise support a means for receiving an indication to re-arrange the one or more reference signals in the measurement report.

In some examples, re-arranging the one or more reference signals includes switching a highest-ranked reference signal to a second-highest rank, and switching a second-highest ranked reference signal to a highest-rank.

In some examples, to support receiving the invalidation message, the invalidation message component 1140 may be configured as or otherwise support a means for receiving an indication to in-validate an entirety of the measurement report.

In some examples, the invalidation message includes one bit, or two bits to indicate that the measurement report is invalidated in entirety.

In some examples, to support receiving the invalidation message, the invalidation message component 1140 may be configured as or otherwise support a means for receiving one or more identifiers associated with at least one of the one or more reference signals that are invalid.

In some examples, the subsequent invalidation message component 1145 may be configured as or otherwise support a means for receiving, subsequent to the invalidation message, a second invalidation message indicating that at least the portion of the measurement report is re-validated.

In some examples, to support receiving the second invalidation message, the subsequent invalidation message component 1145 may be configured as or otherwise support a means for receiving one or more identifiers associated with at least one of the one or more reference signals that are re-validated.

In some examples, the second invalidation message includes one bit, or two bits to indicate that an entirety of the measurement report is re-validated.

In some examples, to support receiving the invalidation message, the invalidation message component 1140 may be configured as or otherwise support a means for receiving an indication of an action from a set of actions associated with the invalidation message, the set of actions including invalidation, re-validation, and re-arranging.

In some examples, the measurement report request component 1150 may be configured as or otherwise support a means for transmitting, in response to the invalidation message, a request for the UE to transmit a second measurement report including updated measurements associated with one or more of the reference signals.

In some examples, the second measurement report is an aperiodic measurement report.

In some examples, to support receiving the invalidation message, the invalidation message component 1140 may be configured as or otherwise support a means for receiving an indication to invalidate a set of multiple measurement reports.

In some examples, the duration indication component 1155 may be configured as or otherwise support a means for transmitting an indication of a duration after transmission of the measurement report the UE is to refrain from transmitting the invalidation message.

In some examples, the duration indication component 1155 may be configured as or otherwise support a means for transmitting an indication of a duration after transmission of the invalidation message the UE is to refrain from transmitting a second invalidation message.

In some examples, the maximum invalidation message indication component 1160 may be configured as or otherwise support a means for transmitting an indication of a maximum number of invalidation messages allowed to be transmitted by the UE prior to reception of a response to one or more of invalidation messages.

In some examples, the invalidation trigger indication component 1165 may be configured as or otherwise support a means for transmitting an indication of a trigger for transmission of the invalidation message, the trigger being a delta between a first measurement of a reference signal and subsequent measurement of the reference signal.

In some examples, the invalidation trigger indication component 1165 may be configured as or otherwise support a means for transmitting an indication of a trigger for transmission of the invalidation message, the trigger being that subsequent measurements of at least two reference signals result in the at least two reference signals being ranked differently than a rank-order included in the measurement report.

In some examples, the duration indication component 1155 may be configured as or otherwise support a means for transmitting an indication of a duration between the set of measurements and subsequent measurements, where the UE is to refrain from measuring the one or more reference signals in the duration.

In some examples, to support receiving the invalidation message, the invalidation message component 1140 may be configured as or otherwise support a means for receiving an uplink control channel message, an uplink shared channel message, or a RACH message including the invalidation message.

In some examples, the beam management component 1170 may be configured as or otherwise support a means for performing beam management procedure based on the measurement report and the invalidation message.

Figure 12:
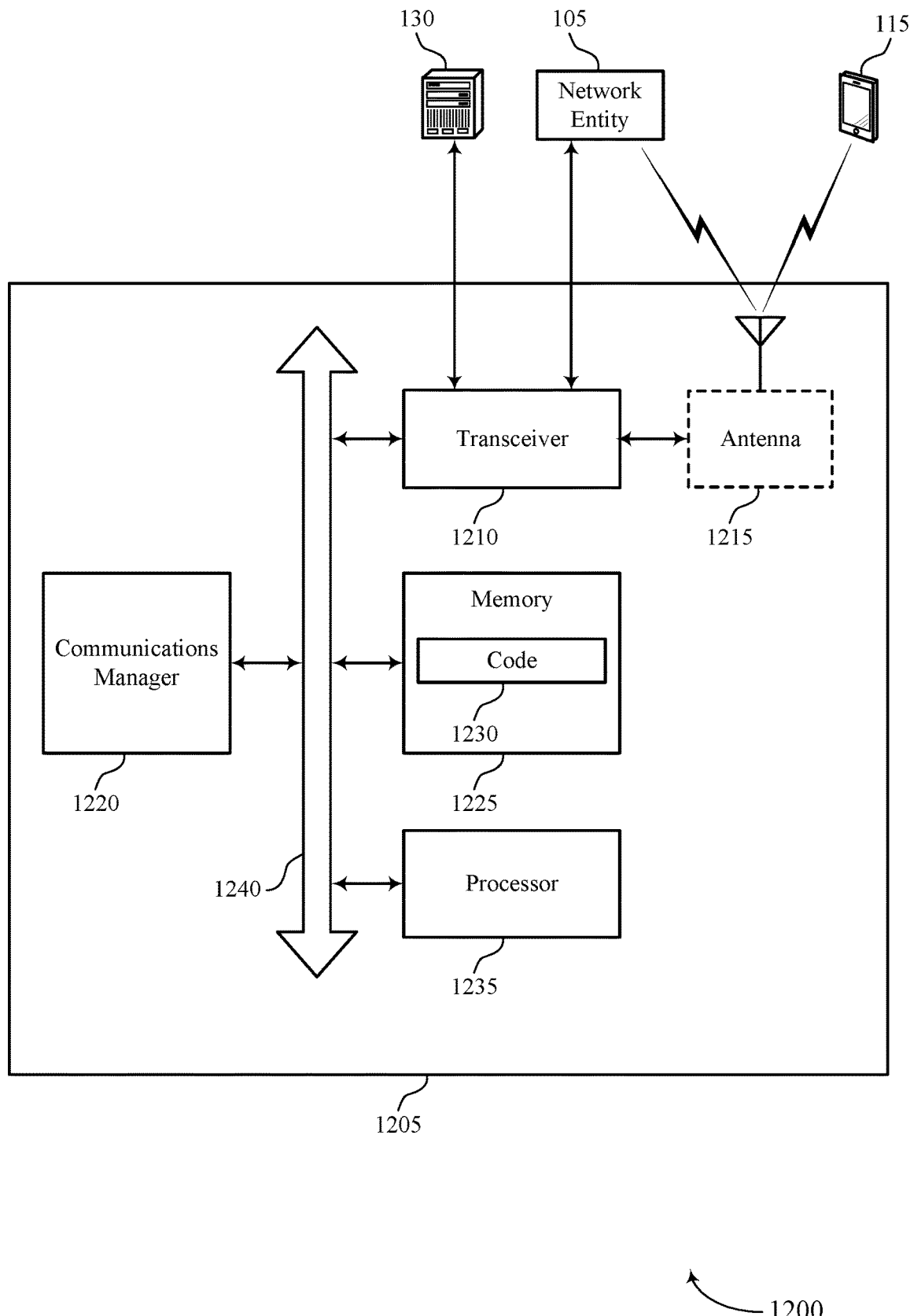
FIG. 12 shows a diagram of a system including a device that supports techniques for invalidating a measurement report in accordance with one or more aspects of the present disclosure.

FIG. 12 shows a diagram of a system 1200 including a device 1205 that supports techniques for invalidating a measurement report in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for invalidating a measurement report). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting a message indicative of a set of parameters associated with transmission of a measurement report by a UE. The communications manager 1220 may be configured as or otherwise support a means for transmitting one or more reference signals. The communications manager 1220 may be configured as or otherwise support a means for receiving, in accordance with the set of parameters, the measurement report indicating a set of measurements associated with the one or more reference signals received by the UE. The communications manager 1220 may be configured as or otherwise support a means for receiving an invalidation message indicating that at least a portion of the measurement report is invalid based on a subsequent measurement associated with the one or more reference signals differing from a corresponding measurement from the set of measurements.

By including or configuring the communications manager 1220 in accordance with examples as described herein, the device 1205 may support techniques for invalidating a measurement report, which may result in improved communication reliability, reduced latency, improved user experience related to reduced processing, reduced power consumption, more efficient utilization of communication resources, improved coordination between devices, longer battery life, or improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of techniques for invalidating a measurement report as described herein, or the processor 1235 and the memory 1225 may be otherwise configured to perform or support such operations.

Figure 13:
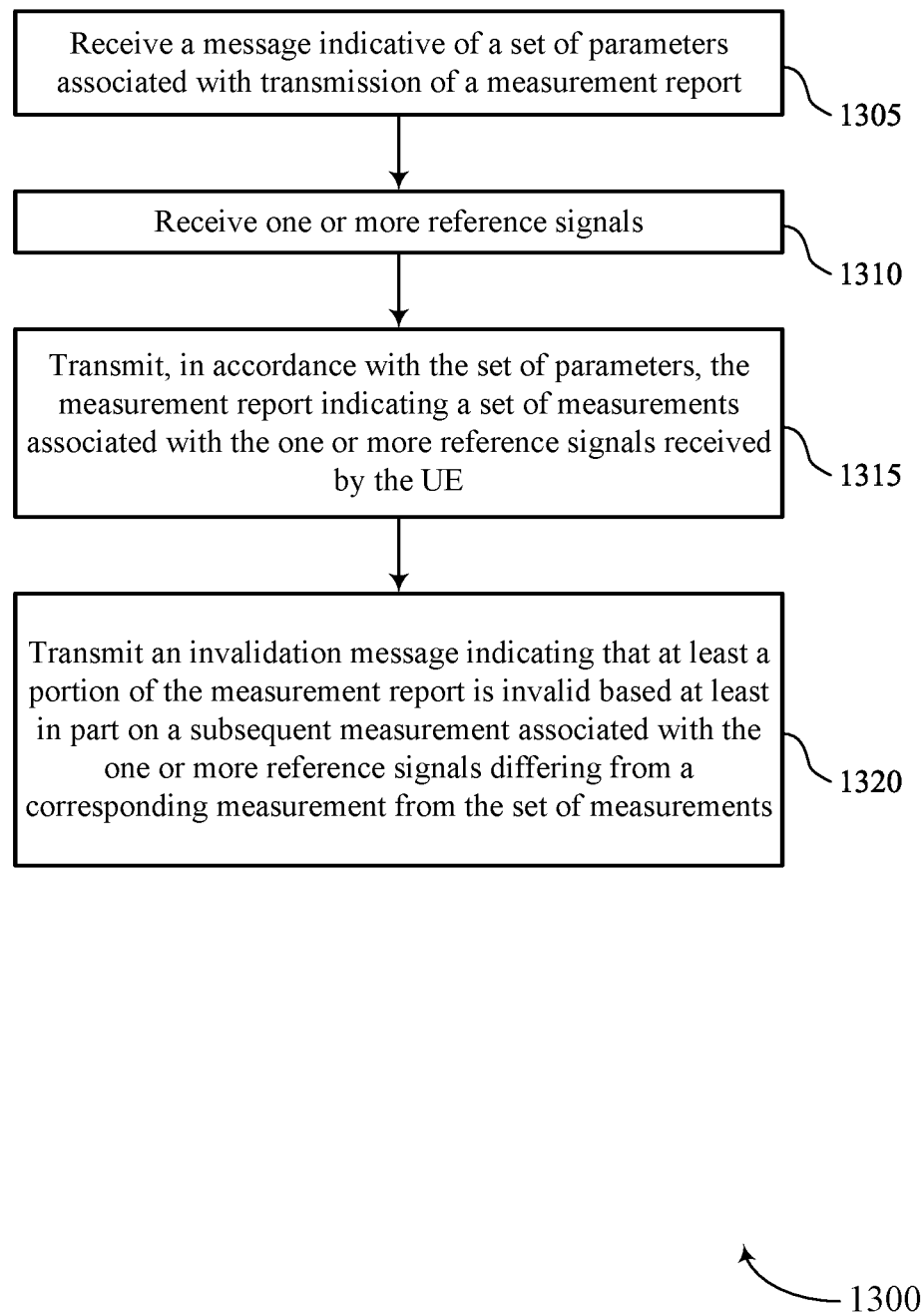
FIGS. 13 through 16 show flowcharts illustrating methods that support techniques for invalidating a measurement report in accordance with one or more aspects of the present disclosure.

FIG. 13 shows a flowchart illustrating a method 1300 that supports techniques for invalidating a measurement report in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a message indicative of a set of parameters associated with transmission of a measurement report. The operations of 1305 may be performed in accordance with examples as disclosed herein. In some examples, aspects of the operations of 1305 may be performed by a measurement report parameters component 725 as described with reference to FIG. 7.

At 1310, the method may include receiving one or more reference signals. The operations of 1310 may be performed in accordance with examples as disclosed herein. In some examples, aspects of the operations of 1310 may be performed by a reference signal component 730 as described with reference to FIG. 7.

At 1315, the method may include transmitting, in accordance with the set of parameters, the measurement report indicating a set of measurements associated with the one or more reference signals received by the UE. The operations of 1315 may be performed in accordance with examples as disclosed herein. In some examples, aspects of the operations of 1315 may be performed by a measurement report component 735 as described with reference to FIG. 7.

At 1320, the method may include transmitting an invalidation message indicating that at least a portion of the measurement report is invalid based on a subsequent measurement associated with the one or more reference signals differing from a corresponding measurement from the set of measurements. The operations of 1320 may be performed in accordance with examples as disclosed herein. In some examples, aspects of the operations of 1320 may be performed by an invalidation message component 740 as described with reference to FIG. 7.

Figure 14:
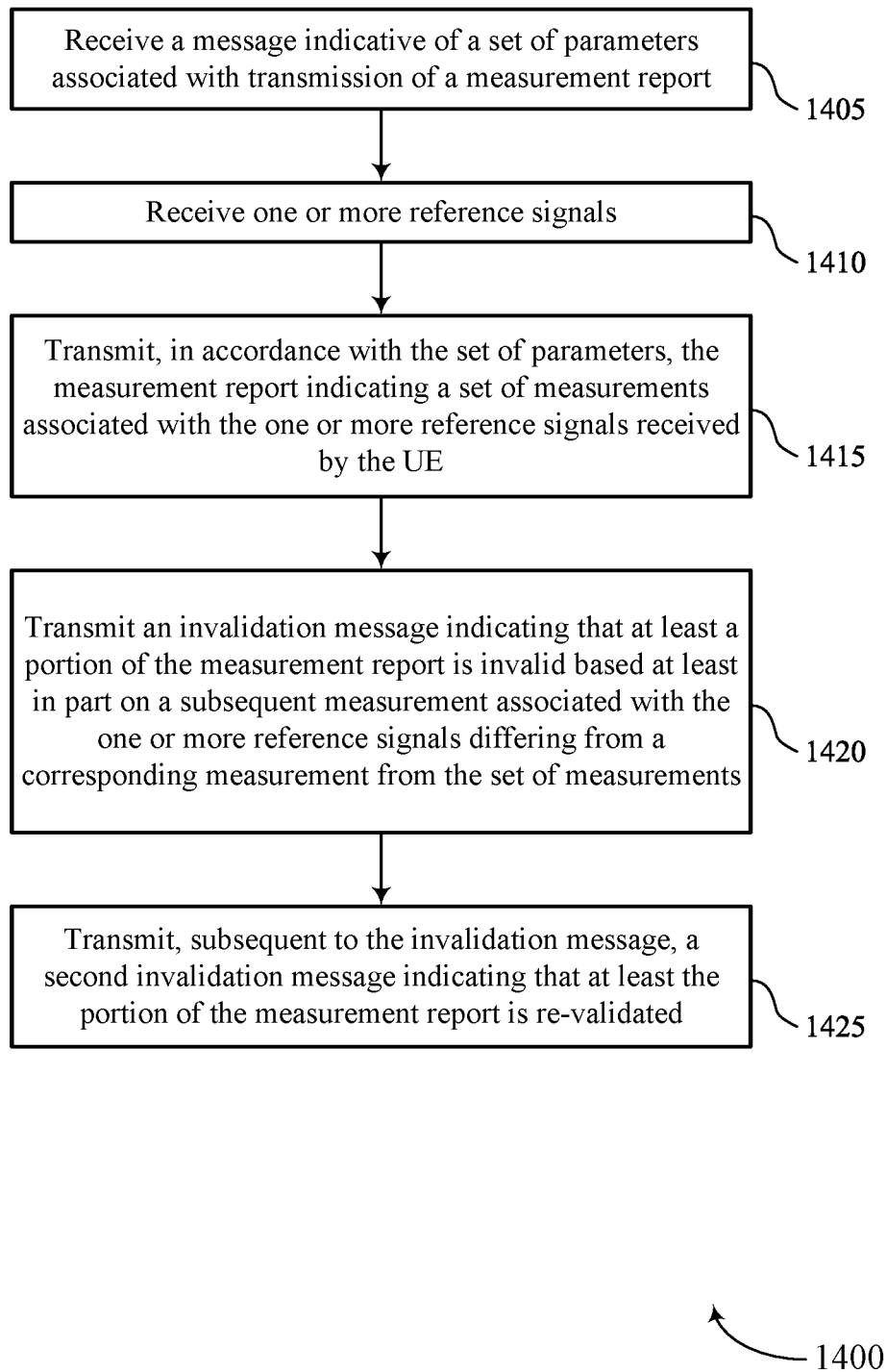

FIG. 14 shows a flowchart illustrating a method 1400 that supports techniques for invalidating a measurement report in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a message indicative of a set of parameters associated with transmission of a measurement report. The operations of 1405 may be performed in accordance with examples as disclosed herein. In some examples, aspects of the operations of 1405 may be performed by a measurement report parameters component 725 as described with reference to FIG. 7.

At 1410, the method may include receiving one or more reference signals. The operations of 1410 may be performed in accordance with examples as disclosed herein. In some examples, aspects of the operations of 1410 may be performed by a reference signal component 730 as described with reference to FIG. 7.

At 1415, the method may include transmitting, in accordance with the set of parameters, the measurement report indicating a set of measurements associated with the one or more reference signals received by the UE. The operations of 1415 may be performed in accordance with examples as disclosed herein. In some examples, aspects of the operations of 1415 may be performed by a measurement report component 735 as described with reference to FIG. 7.

At 1420, the method may include transmitting an invalidation message indicating that at least a portion of the measurement report is invalid based on a subsequent measurement associated with the one or more reference signals differing from a corresponding measurement from the set of measurements. The operations of 1420 may be performed in accordance with examples as disclosed herein. In some examples, aspects of the operations of 1420 may be performed by an invalidation message component 740 as described with reference to FIG. 7.

At 1425, the method may include transmitting, subsequent to the invalidation message, a second invalidation message indicating that at least the portion of the measurement report is re-validated. The operations of 1425 may be performed in accordance with examples as disclosed herein. In some examples, aspects of the operations of 1425 may be performed by a second invalidation message component 745 as described with reference to FIG. 7.

Figure 15:
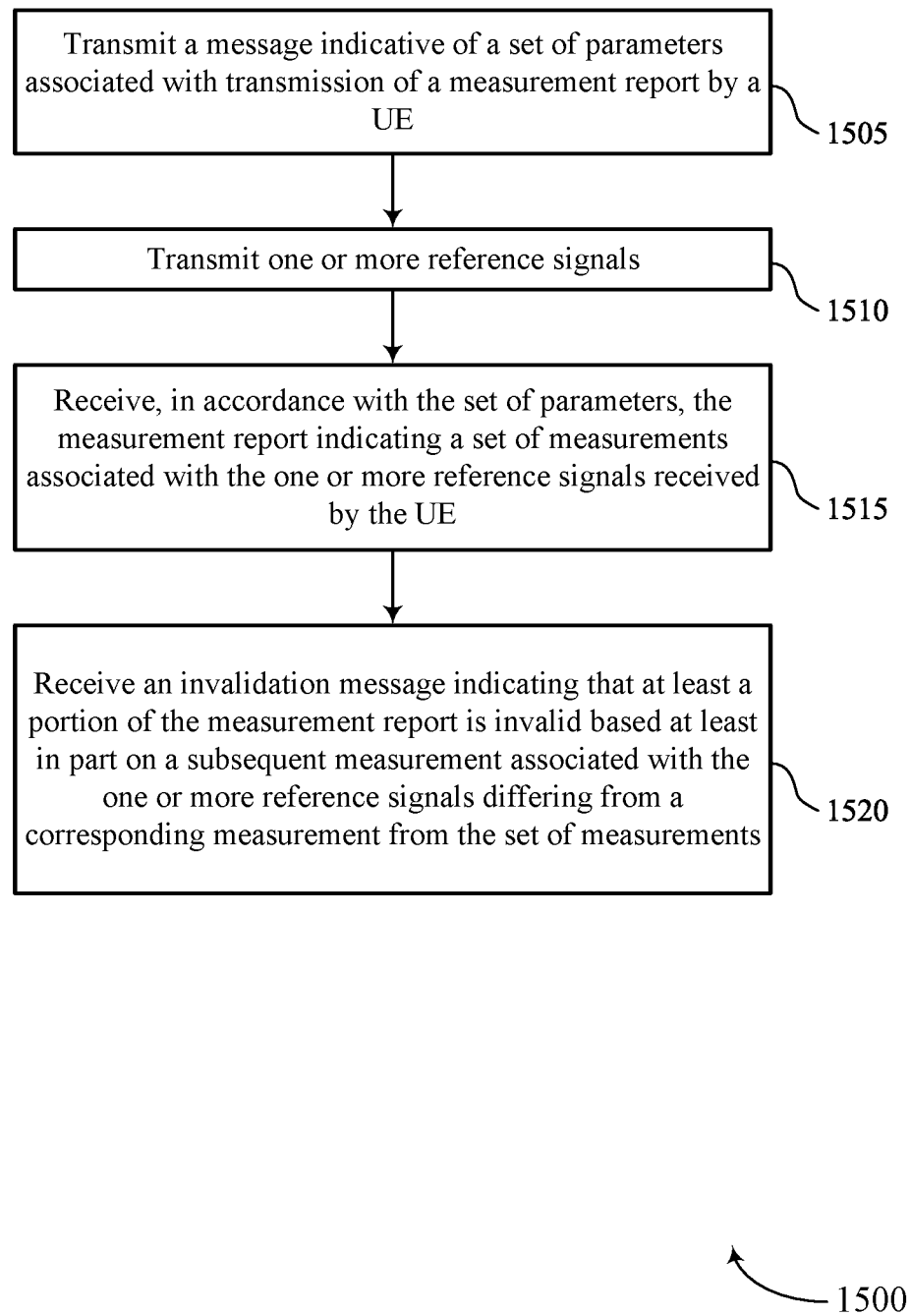

FIG. 15 shows a flowchart illustrating a method 1500 that supports techniques for invalidating a measurement report in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a message indicative of a set of parameters associated with transmission of a measurement report by a UE. The operations of 1505 may be performed in accordance with examples as disclosed herein. In some examples, aspects of the operations of 1505 may be performed by a measurement report parameters component 1125 as described with reference to FIG. 11.

At 1510, the method may include transmitting one or more reference signals. The operations of 1510 may be performed in accordance with examples as disclosed herein. In some examples, aspects of the operations of 1510 may be performed by a reference signal component 1130 as described with reference to FIG. 11.

At 1515, the method may include receiving, in accordance with the set of parameters, the measurement report indicating a set of measurements associated with the one or more reference signals received by the UE. The operations of 1515 may be performed in accordance with examples as disclosed herein. In some examples, aspects of the operations of 1515 may be performed by a measurement report component 1135 as described with reference to FIG. 11.

At 1520, the method may include receiving an invalidation message indicating that at least a portion of the measurement report is invalid based on a subsequent measurement associated with the one or more reference signals differing from a corresponding measurement from the set of measurements. The operations of 1520 may be performed in accordance with examples as disclosed herein. In some examples, aspects of the operations of 1520 may be performed by an invalidation message component 1140 as described with reference to FIG. 11.

Figure 16:
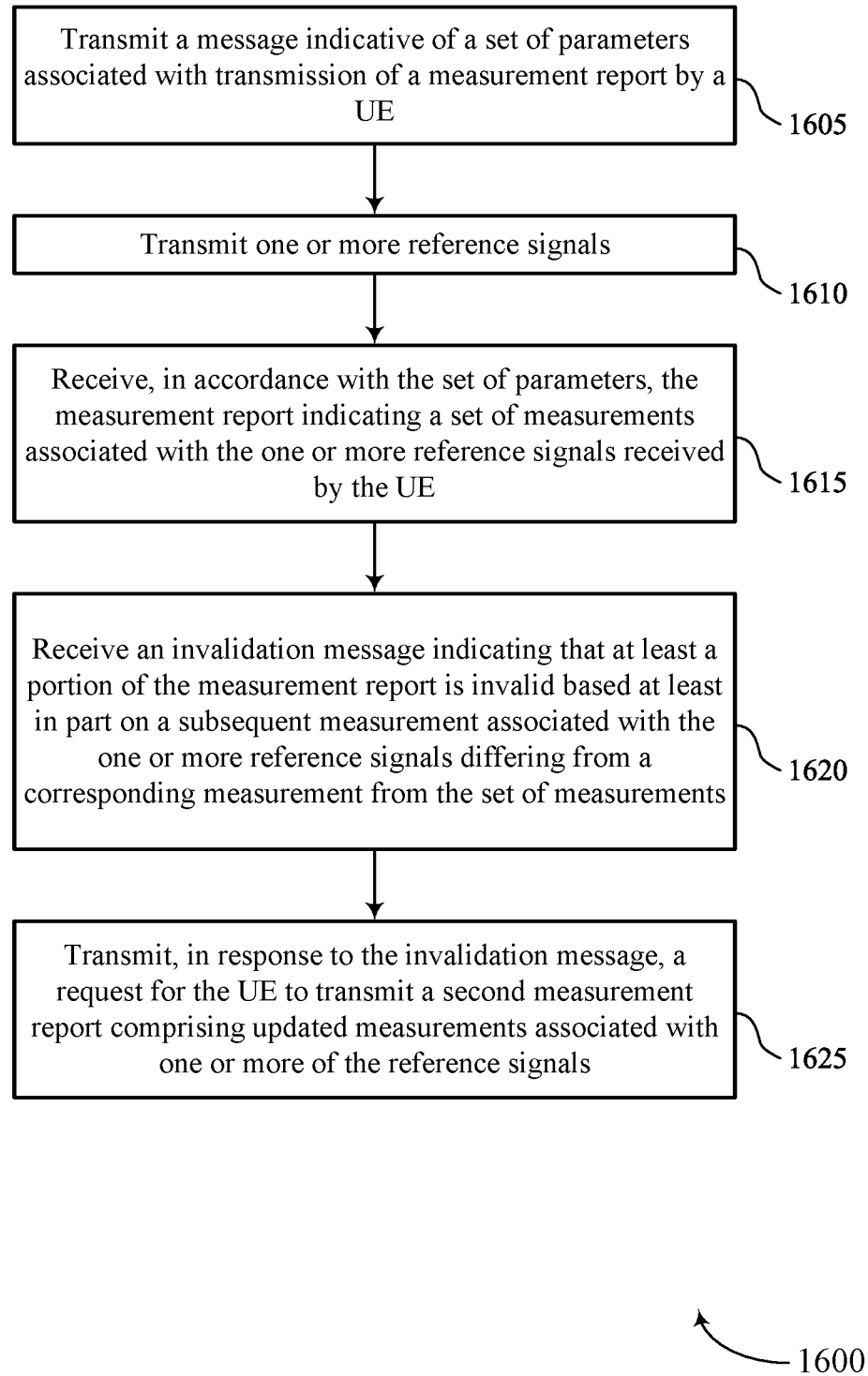

FIG. 16 shows a flowchart illustrating a method 1600 that supports techniques for invalidating a measurement report in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a message indicative of a set of parameters associated with transmission of a measurement report by a UE. The operations of 1605 may be performed in accordance with examples as disclosed herein. In some examples, aspects of the operations of 1605 may be performed by a measurement report parameters component 1125 as described with reference to FIG. 11.

At 1610, the method may include transmitting one or more reference signals. The operations of 1610 may be performed in accordance with examples as disclosed herein. In some examples, aspects of the operations of 1610 may be performed by a reference signal component 1130 as described with reference to FIG. 11.

At 1615, the method may include receiving, in accordance with the set of parameters, the measurement report indicating a set of measurements associated with the one or more reference signals received by the UE. The operations of 1615 may be performed in accordance with examples as disclosed herein. In some examples, aspects of the operations of 1615 may be performed by a measurement report component 1135 as described with reference to FIG. 11.

At 1620, the method may include receiving an invalidation message indicating that at least a portion of the measurement report is invalid based on a subsequent measurement associated with the one or more reference signals differing from a corresponding measurement from the set of measurements. The operations of 1620 may be performed in accordance with examples as disclosed herein. In some examples, aspects of the operations of 1620 may be performed by an invalidation message component 1140 as described with reference to FIG. 11.

At 1625, the method may include transmitting, in response to the invalidation message, a request for the UE to transmit a second measurement report including updated measurements associated with one or more of the reference signals. The operations of 1625 may be performed in accordance with examples as disclosed herein. In some examples, aspects of the operations of 1625 may be performed by a measurement report request component 1150 as described with reference to FIG. 11.

The following provides an overview of aspects of the present disclosure:

Aspect 1: A method for wireless communications at a UE, comprising: receiving a message indicative of a set of parameters associated with transmission of a measurement report; receiving one or more reference signals; transmitting, in accordance with the set of parameters, the measurement report indicating a set of measurements associated with the one or more reference signals received by the UE; and transmitting an invalidation message indicating that at least a portion of the measurement report is invalid based at least in part on a subsequent measurement associated with the one or more reference signals differing from a corresponding measurement from the set of measurements.

Aspect 2: The method of aspect 1, wherein transmitting the invalidation message comprises: transmitting an indication to re-arrange the one or more reference signals in the measurement report.

Aspect 3: The method of aspect 2, wherein re-arranging the one or more reference signals comprises switching a highest-ranked reference signal to a second-highest rank, and switching a second-highest ranked reference signal to a highest-rank.

Aspect 4: The method of any of aspects 1 through 3, wherein transmitting the invalidation message comprises: transmitting an indication to in-validate an entirety of the measurement report.

Aspect 5: The method of aspect 4, wherein the invalidation message comprises one bit, or two bits to indicate that the measurement report is invalidated in entirety.

Aspect 6: The method of any of aspects 1 through 5, wherein transmitting the invalidation message comprises: transmitting identifiers of the one or more reference signals that are invalid.

Aspect 7: The method of any of aspects 1 through 6, further comprising: transmitting, subsequent to the invalidation message, a second invalidation message indicating that at least the portion of the measurement report is re-validated.

Aspect 8: The method of aspect 7, wherein transmitting the second invalidation message comprises: transmitting one or more identifiers associated with at least one of the one or more reference signals that are re-validated.

Aspect 9: The method of any of aspects 7 through 8, wherein transmitting the second invalidation message comprises: transmitting a set of one or more bits to indicate that an entirety of the measurement report is re-validated.

Aspect 10: The method of any of aspects 1 through 9, wherein transmitting the invalidation message comprises: transmitting an indication of an action from a set of actions associated with the invalidation message, the set of actions comprising invalidation, re-validation, and re-arranging.

Aspect 11: The method of any of aspects 1 through 10, further comprising: receiving, in response to the invalidation message, a request to transmit a second measurement report comprising updated measurements associated with one or more of the reference signals.

Aspect 12: The method of aspect 11, wherein the second measurement report is an aperiodic measurement report.

Aspect 13: The method of any of aspects 1 through 12, wherein transmitting the invalidation message comprises: transmitting an indication to invalidate a plurality of measurement reports.

Aspect 14: The method of any of aspects 1 through 13, further comprising: receiving an indication of a duration after transmission of the measurement report the UE is to refrain from transmitting the invalidation message.

Aspect 15: The method of any of aspects 1 through 14, further comprising: receiving an indication of a duration after transmission of the invalidation message the UE is to refrain from transmitting a second invalidation message.

Aspect 16: The method of any of aspects 1 through 15, further comprising: receiving an indication of a maximum number of invalidation messages allowed to be transmitted by the UE prior to reception of a response to one or more invalidation messages.

Aspect 17: The method of any of aspects 1 through 16, further comprising: receiving an indication of a trigger for transmission of the invalidation message, the trigger being a delta between a first measurement of a reference signal and subsequent measurement of the reference signal.

Aspect 18: The method of any of aspects 1 through 17, further comprising: receiving an indication of a trigger for transmission of the invalidation message, the trigger being that subsequent measurements of at least two reference signals result in the at least two reference signals being ranked differently than a rank-order included in the measurement report.

Aspect 19: The method of any of aspects 1 through 18, further comprising: receiving an indication of a duration between the set of measurements and subsequent measurements, wherein the UE is to refrain from measuring the one or more reference signals in the duration.

Aspect 20: The method of any of aspects 1 through 19, wherein transmitting the invalidation message comprises: transmitting an uplink control channel message, an uplink shared channel message, or a random access channel message comprising the invalidation message.

Aspect 21: The method of any of aspects 1 through 20, further comprising: performing filtering of the subsequent measurement associated with the one or more reference signals, wherein transmission of the invalidation message is based at least in part on the filtering.

Aspect 22: A method for wireless communications at a network entity, comprising: transmitting a message indicative of a set of parameters associated with transmission of a measurement report by a UE; transmitting one or more reference signals; receiving, in accordance with the set of parameters, the measurement report indicating a set of measurements associated with the one or more reference signals received by the UE; and receiving an invalidation message indicating that at least a portion of the measurement report is invalid based at least in part on a subsequent measurement associated with the one or more reference signals differing from a corresponding measurement from the set of measurements.

Aspect 23: The method of aspect 22, wherein receiving the invalidation message comprises: receiving an indication to re-arrange the one or more reference signals in the measurement report.

Aspect 24: The method of aspect 23, wherein re-arranging the one or more reference signals comprises switching a highest-ranked reference signal to a second-highest rank, and switching a second-highest ranked reference signal to a highest-rank.

Aspect 25: The method of any of aspects 22 through 24, wherein receiving the invalidation message comprises: receiving an indication to in-validate an entirety of the measurement report.

Aspect 26: The method of aspect 25, wherein the invalidation message comprises one bit, or two bits to indicate that the measurement report is invalidated in entirety.

Aspect 27: The method of any of aspects 22 through 26, wherein receiving the invalidation message comprises: receiving one or more identifiers associated with at least one of the one or more reference signals that are invalid.

Aspect 28: The method of any of aspects 22 through 27, further comprising: receiving, subsequent to the invalidation message, a second invalidation message indicating that at least the portion of the measurement report is re-validated.

Aspect 29: The method of aspect 28, wherein receiving the second invalidation message comprises: receiving one or more identifiers associated with at least one of the one or more reference signals that are re-validated.

Aspect 30: The method of any of aspects 28 through 29, wherein the second invalidation message comprises one bit, or two bits to indicate that an entirety of the measurement report is re-validated.

Aspect 31: The method of any of aspects 22 through 30, wherein receiving the invalidation message comprises: receiving an indication of an action from a set of actions associated with the invalidation message, the set of actions comprising invalidation, re-validation, and re-arranging.

Aspect 32: The method of any of aspects 22 through 31, further comprising: transmitting, in response to the invalidation message, a request for the UE to transmit a second measurement report comprising updated measurements associated with one or more of the reference signals.

Aspect 33: The method of aspect 32, wherein the second measurement report is an aperiodic measurement report.

Aspect 34: The method of any of aspects 22 through 33, wherein receiving the invalidation message comprises: receiving an indication to invalidate a plurality of measurement reports.

Aspect 35: The method of any of aspects 22 through 34, further comprising: transmitting an indication of a duration after transmission of the measurement report the UE is to refrain from transmitting the invalidation message.

Aspect 36: The method of any of aspects 22 through 35, further comprising: transmitting an indication of a duration after transmission of the invalidation message the UE is to refrain from transmitting a second invalidation message.

Aspect 37: The method of any of aspects 22 through 36, further comprising: transmitting an indication of a maximum number of invalidation messages allowed to be transmitted by the UE prior to reception of a response to one or more of invalidation messages.

Aspect 38: The method of any of aspects 22 through 37, further comprising: transmitting an indication of a trigger for transmission of the invalidation message, the trigger being a delta between a first measurement of a reference signal and subsequent measurement of the reference signal.

Aspect 39: The method of any of aspects 22 through 38, further comprising: transmitting an indication of a trigger for transmission of the invalidation message, the trigger being that subsequent measurements of at least two reference signals result in the at least two reference signals being ranked differently than a rank-order included in the measurement report.

Aspect 40: The method of any of aspects 22 through 39, further comprising: transmitting an indication of a duration between the set of measurements and subsequent measurements, wherein the UE is to refrain from measuring the one or more reference signals in the duration.

Aspect 41: The method of any of aspects 22 through 40, wherein receiving the invalidation message comprises: receiving an uplink control channel message, an uplink shared channel message, or a random access channel message comprising the invalidation message.

Aspect 42: The method of any of aspects 22 through 41, further comprising: performing beam management procedure based at least in part on the measurement report and the invalidation message.

Aspect 43: An apparatus for wireless communications at a UE, comprising a processor; memory coupled with the processor; and instructions stored in the memory and executable by the processor to cause the apparatus to perform a method of any of aspects 1 through 21.

Aspect 44: An apparatus for wireless communications at a UE, comprising at least one means for performing a method of any of aspects 1 through 21.

Aspect 45: A non-transitory computer-readable medium storing code for wireless communications at a UE, the code comprising instructions executable by a processor to perform a method of any of aspects 1 through 21.

Aspect 46: An apparatus for wireless communications at a network entity, comprising a processor; memory coupled with the processor; and instructions stored in the memory and executable by the processor to cause the apparatus to perform a method of any of aspects 22 through 42.

Aspect 47: An apparatus for wireless communications at a network entity, comprising at least one means for performing a method of any of aspects 22 through 42.

Aspect 48: A non-transitory computer-readable medium storing code for wireless communications at a network entity, the code comprising instructions executable by a processor to perform a method of any of aspects 22 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a message indicative of a set of parameters associated with transmission of a measurement report;
   receiving one or more reference signals at the UE;
   transmitting, in accordance with the set of parameters, the measurement report indicating a set of measurements associated with the one or more reference signals received by the UE; and
   transmitting an invalidation message indicating that at least a portion of the measurement report is invalid based at least in part on a subsequent measurement associated with the one or more reference signals differing from a corresponding measurement from the set of measurements.

2. The method of claim 1, wherein transmitting the invalidation message comprises:
   transmitting an indication to re-arrange the one or more reference signals in the measurement report.

3. The method of claim 2, wherein re-arranging the one or more reference signals comprises switching a highest-ranked reference signal to a second-highest rank, and switching a second-highest ranked reference signal to a highest-rank.

4. The method of claim 1, wherein transmitting the invalidation message comprises:
   transmitting an indication to in-validate an entirety of the measurement report.

5. The method of claim 4, wherein the invalidation message comprises one bit, or two bits to indicate that the measurement report is invalidated in entirety.

6. The method of claim 1, wherein transmitting the invalidation message comprises:
   transmitting identifiers of the one or more reference signals that are invalid.

7. The method of claim 1, further comprising:
   transmitting, subsequent to the invalidation message, a second invalidation message indicating that at least the portion of the measurement report is re-validated.

8. The method of claim 7, wherein transmitting the second invalidation message comprises:
   transmitting one or more identifiers associated with at least one of the one or more reference signals that are re-validated.

9. The method of claim 7, wherein transmitting the second invalidation message comprises:
   transmitting a set of one or more bits to indicate that an entirety of the measurement report is re-validated.

10. The method of claim 1, wherein transmitting the invalidation message comprises:
    transmitting an indication of an action from a set of actions associated with the invalidation message, the set of actions comprising invalidation, re-validation, and re-arranging.

11. The method of claim 1, further comprising:
    receiving, in response to the invalidation message, a request to transmit a second measurement report comprising updated measurements associated with the one or more reference signals.

12. The method of claim 11, wherein the second measurement report is an aperiodic measurement report.

13. The method of claim 1, wherein transmitting the invalidation message comprises:
    transmitting an indication to invalidate a plurality of measurement reports.

14. The method of claim 1, further comprising:
    receiving an indication of a duration after transmission of the measurement report the UE is to refrain from transmitting the invalidation message.

15. The method of claim 1, further comprising:
    receiving an indication of a duration after transmission of the invalidation message the UE is to refrain from transmitting a second invalidation message.

16. The method of claim 1, further comprising:
    receiving an indication of a maximum number of invalidation messages allowed to be transmitted by the UE prior to reception of a response to one or more invalidation messages.

17. The method of claim 1, further comprising:
    receiving an indication of a trigger for transmission of the invalidation message, the trigger being a delta between a first measurement of a reference signal and a subsequent measurement of the reference signal.

18. The method of claim 1, further comprising:
    receiving an indication of a trigger for transmission of the invalidation message, the trigger being that subsequent measurements of at least two reference signals result in the at least two reference signals being ranked differently than a rank-order included in the measurement report.

19. The method of claim 1, further comprising:
    receiving an indication of a duration between the set of measurements and subsequent measurements, wherein the UE is to refrain from measuring the one or more reference signals in the duration.

20. The method of claim 1, wherein transmitting the invalidation message comprises:
    transmitting an uplink control channel message, an uplink shared channel message, or a random access channel message comprising the invalidation message.

21. The method of claim 1, further comprising:
    performing filtering of the subsequent measurement associated with the one or more reference signals, wherein transmission of the invalidation message is based at least in part on the filtering.

22. An apparatus for wireless communications at a user equipment (UE), comprising:
    a processor;
    memory coupled with the processor; and
    instructions stored in the memory and executable by the processor to cause the apparatus to:
        receive a message indicative of a set of parameters associated with transmission of a measurement report;
        receive one or more reference signals at the UE;
        transmit, in accordance with the set of parameters, the measurement report indicating a set of measurements associated with the one or more reference signals received by the UE; and
        transmit an invalidation message indicating that at least a portion of the measurement report is invalid based at least in part on a subsequent measurement associated with the one or more reference signals differing from a corresponding measurement from the set of measurements.

23. The apparatus of claim 22, wherein the instructions to transmit the invalidation message are executable by the processor to cause the apparatus to:
    transmit an indication to re-arrange the one or more reference signals in the measurement report.

24. The apparatus of claim 23, wherein re-arranging the one or more reference signals comprises switching a highest-ranked reference signal to a second-highest rank, and switching a second-highest ranked reference signal to a highest-rank.

25. The apparatus of claim 22, wherein the instructions to transmit the invalidation message are executable by the processor to cause the apparatus to:
    transmit an indication to in-validate an entirety of the measurement report.

26. The apparatus of claim 25, wherein the invalidation message comprises one bit, or two bits to indicate that the measurement report is invalidated in entirety.

27. The apparatus of claim 22, wherein the instructions to transmit the invalidation message are executable by the processor to cause the apparatus to:
    transmit identifiers of the one or more reference signals that are invalid.

28. The apparatus of claim 22, wherein the instructions are further executable by the processor to cause the apparatus to:
    transmit, subsequent to the invalidation message, a second invalidation message indicating that at least the portion of the measurement report is re-validated.

29. An apparatus for wireless communications at a user equipment (UE), comprising:
    means for receiving a message indicative of a set of parameters associated with transmission of a measurement report;
    means for receiving one or more reference signals at the UE;
    means for transmitting, in accordance with the set of parameters, the measurement report indicating a set of measurements associated with the one or more reference signals received by the UE; and
    means for transmitting an invalidation message indicating that at least a portion of the measurement report is invalid based at least in part on a subsequent measurement associated with the one or more reference signals differing from a corresponding measurement from the set of measurements.

30. A non-transitory computer-readable medium storing code for wireless communications at a user equipment (UE), the code comprising instructions executable by a processor to:
- receive a message indicative of a set of parameters associated with transmission of a measurement report;
- receive one or more reference signals at the UE;
- transmit, in accordance with the set of parameters, the measurement report indicating a set of measurements associated with the one or more reference signals received by the UE; and
- transmit an invalidation message indicating that at least a portion of the measurement report is invalid based at least in part on a subsequent measurement associated with the one or more reference signals differing from a corresponding measurement from the set of measurements.

* * * * *